(12) United States Patent
Takai et al.

(10) Patent No.: US 8,016,618 B2
(45) Date of Patent: Sep. 13, 2011

(54) MULTIPLE INTEGRATED CIRCUIT CARD CONNECTOR WITH A CARD DETECTION TERMINAL

(75) Inventors: Yosuke Takai, Sakura (JP); Takamitsu Sasaki, Tokyo (JP); Shigeru Sato, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/751,760

(22) Filed: Mar. 31, 2010

(65) Prior Publication Data

US 2010/0255699 A1     Oct. 7, 2010

(30) Foreign Application Priority Data

Apr. 1, 2009    (JP) .................................. 2009-089348
Feb. 26, 2010    (JP) .................................. 2010-042651

(51) Int. Cl.
*H01R 24/00*      (2006.01)
(52) U.S. Cl. ........................... 439/630; 439/947
(58) Field of Classification Search .................. 439/152, 439/630, 947, 946, 377
See application file for complete search history.

(56) References Cited

U.S. PATENT DOCUMENTS

| | | |
|---|---|---|
| 3,980,167 A | 9/1976 | Tamura et al. |
| 4,404,464 A | 9/1983 | Moreno |
| 4,421,372 A | 12/1983 | Golden |
| 4,722,693 A | 2/1988 | Rose |
| 5,035,633 A | 7/1991 | Kobayashi et al. |
| 5,179,504 A | 1/1993 | Kitahara |
| 5,207,598 A | 5/1993 | Yamada et al. |
| 5,300,763 A | 4/1994 | Ito et al. |
| 5,490,791 A | 2/1996 | Yamada et al. |
| 5,563,397 A | 10/1996 | Fujimoto et al. |
| 5,876,218 A | 3/1999 | Liebenow et al. |
| 6,045,049 A | 4/2000 | Nishimura et al. |
| 6,056,573 A | 5/2000 | Nishioka |
| 6,068,365 A | 5/2000 | Nagoshi et al. |
| 6,068,500 A | 5/2000 | Kantner |
| 6,089,919 A | 7/2000 | Nishioka |
| 6,109,940 A | 8/2000 | Chad et al. |
| 6,123,557 A | 9/2000 | Wang et al. |
| 6,129,571 A | 10/2000 | Ikemoto |
| 6,129,572 A | 10/2000 | Feldman et al. |

(Continued)

FOREIGN PATENT DOCUMENTS

DE             1033491        7/1958

(Continued)

OTHER PUBLICATIONS

CN 2520582Y.

(Continued)

*Primary Examiner* — Hae Moon Hyeon
(74) *Attorney, Agent, or Firm* — Finnegan, Henderson, Farabow, Garrett & Dunner, LLP

(57) ABSTRACT

An integrated circuit ("IC") connector includes a card detection contact terminal which is provided substantially at a central part of a housing unit and between a first grounding contact terminal and a second grounding contact terminal, and first and second contact terminals located so as to face each other along a direction of mounting and demounting of a first IC card, the first contact terminals provided adjacent to and both sides of the card detection contact terminal, the second contact terminals provided adjacent to both sides of the card detection contact terminal.

7 Claims, 13 Drawing Sheets

U.S. PATENT DOCUMENTS

| | | | |
|---|---|---|---|
| 6,135,809 | A | 10/2000 | Asakawa |
| 6,186,401 | B1 | 2/2001 | Magana |
| 6,203,378 | B1 | 3/2001 | Shobara et al. |
| 6,231,360 | B1 | 5/2001 | Horie |
| 6,234,845 | B1 | 5/2001 | Hakozaki |
| 6,345,760 | B1 | 2/2002 | Eason et al. |
| 6,361,369 | B1 | 3/2002 | Kondo et al. |
| 6,386,920 | B1 | 5/2002 | Sun |
| 6,399,906 | B1 | 6/2002 | Sato et al. |
| 6,402,529 | B2 | 6/2002 | Saito et al. |
| 6,413,108 | B2 | 7/2002 | Centofante |
| 6,457,647 | B1 | 10/2002 | Kurihashi et al. |
| 6,468,101 | B2 | 10/2002 | Suzuki |
| 6,482,029 | B2 | 11/2002 | Nishimura |
| 6,503,092 | B1 | 1/2003 | Sato |
| 6,508,402 | B1 | 1/2003 | Takada et al. |
| 6,511,350 | B1 | 1/2003 | Ito et al. |
| 6,524,137 | B1 | 2/2003 | Liu et al. |
| 6,527,590 | B2 | 3/2003 | Oguchi |
| 6,547,601 | B2 | 4/2003 | Oguchi |
| 6,601,766 | B2 | 8/2003 | Nakagawa et al. |
| 6,607,404 | B1 | 8/2003 | Ito et al. |
| 6,607,405 | B2 | 8/2003 | Nishimura |
| 6,612,492 | B1 | 9/2003 | Yen |
| 6,641,413 | B2 | 11/2003 | Kuroda |
| 6,655,972 | B2 | 12/2003 | Sato |
| 6,655,973 | B2 | 12/2003 | Ji et al. |
| 6,666,724 | B1 | 12/2003 | Lwee |
| 6,699,053 | B2 | 3/2004 | Kuroda |
| 6,699,061 | B2 | 3/2004 | Abe et al. |
| 6,700,788 | B2 | 3/2004 | Matsushita et al. |
| 6,716,066 | B1 | 4/2004 | Kuo |
| 6,749,450 | B1 | 6/2004 | Chen |
| 6,780,062 | B2 | 8/2004 | Liu et al. |
| 6,783,399 | B2 | 8/2004 | Joung |
| 6,863,571 | B2 | 3/2005 | Sato et al. |
| 6,902,407 | B2 | 6/2005 | Ito et al. |
| 6,913,492 | B2 | 7/2005 | Kurodu et al. |
| 6,976,870 | B1 | 12/2005 | Li |
| 7,052,325 | B2 | 5/2006 | Lin et al. |
| 7,059,909 | B1 * | 6/2006 | Tseng et al. ............ 439/630 |
| 7,118,397 | B1 | 10/2006 | Su et al. |
| 7,182,645 | B2 | 2/2007 | Shimizu et al. |
| 7,367,844 | B2 * | 5/2008 | Xu ............ 439/630 |
| 7,438,598 | B1 | 10/2008 | Ito et al. |
| 7,628,653 | B2 * | 12/2009 | Zhang et al. ............ 439/630 |
| 7,661,971 | B1 | 2/2010 | Abe |
| 2003/0157839 | A1 | 8/2003 | Yamaguchi et al. |
| 2004/0026507 | A1 | 2/2004 | Nagata et al. |
| 2004/0106326 | A1 | 6/2004 | Hsieh |
| 2004/0110423 | A1 | 6/2004 | Shishikura et al. |
| 2006/0057892 | A1 | 3/2006 | Bricaud et al. |
| 2009/0286416 | A1 * | 11/2009 | Wu ............ 439/328 |
| 2010/0022136 | A1 | 1/2010 | Kikuchi |
| 2010/0035474 | A1 * | 2/2010 | Xu et al. ............ 439/630 |
| 2010/0112835 | A1 * | 5/2010 | Matsunaga ............ 439/79 |

FOREIGN PATENT DOCUMENTS

| | | |
|---|---|---|
| DE | 3 937 383 A1 | 6/1990 |
| DE | 4 139 482 | 6/1993 |
| EP | 0 284 431 A2 | 9/1988 |
| EP | 0 696 008 | 2/1996 |
| EP | 1 487 001 | 9/1997 |
| EP | 0 936 705 A2 | 8/1999 |
| EP | 0 939 582 A2 | 9/1999 |
| EP | 1 146 474 | 10/2001 |
| EP | 1 246 312 A2 | 10/2002 |
| EP | 1 324 256 | 7/2003 |
| JP | 63-133473 | 6/1988 |
| JP | 07-335321 | 12/1995 |
| JP | 10-21348 | 1/1998 |
| JP | 10-091729 | 4/1998 |
| JP | 2784346 | 5/1998 |
| JP | 10-187896 | 7/1998 |
| JP | 2843306 | 10/1998 |
| JP | 2973402 | 9/1999 |
| JP | 11-316110 | 11/1999 |
| JP | 2000-277200 | 6/2000 |
| JP | 2000-251024 | 9/2000 |
| JP | 2000-251025 | 9/2000 |
| JP | 2000-260524 | 9/2000 |
| JP | 2001-135385 | 5/2001 |
| JP | 2001-195546 | 7/2001 |
| JP | 2001-237027 | 8/2001 |
| JP | 2002-157056 | 5/2002 |
| JP | 2002-164124 | 6/2002 |
| JP | 2002-174532 | 6/2002 |
| JP | 2002-289280 | 10/2002 |
| JP | 2002-289295 | 10/2002 |
| JP | 2002-289299 | 10/2002 |
| JP | 2002-343498 | 11/2002 |
| JP | 3396457 B2 | 2/2003 |
| JP | 3429266 | 5/2003 |
| JP | 2003-288962 | 10/2003 |
| JP | 2003-317858 | 11/2003 |
| JP | 2004-071257 | 3/2004 |
| JP | 2004-095234 | 3/2004 |
| JP | 2004-193111 | 7/2004 |
| JP | 2004-214119 | 7/2004 |
| JP | 2004-311123 | 11/2004 |
| JP | 2004-311416 | 11/2004 |
| JP | 2005-011666 | 1/2005 |
| JP | 2005-044780 | 2/2005 |
| JP | 2005-135696 | 5/2005 |
| JP | 3713003 | 8/2005 |
| JP | 2006-108118 | 4/2006 |
| JP | 2006-520073 | 8/2006 |
| JP | 2007-157356 | 6/2007 |
| JP | 2007-323945 | 12/2007 |

OTHER PUBLICATIONS

English Abstract for Japanese Publication No. 08055661, dated Feb. 27, 1996, Application No. 06219371, application date Aug. 10, 1994, for inventor Yoshikawa Takamasa, Title: Card Connecting Adaptor.

International Search Report Application No. PCT/JP00/007762, dated Feb. 6, 2001 from the European Patent Office.

Office Action dated Feb. 19, 2008 in counterpart Japanese Patent Application No. 2004-016394.

Office Action dated Jul. 18, 2008 issued in corresponding Japanese Application No. 2005-106769.

Office Action dated Jun. 6, 2008 in corresponding Chinese Patent Application No. 200610067036.7.

Office Action in co-pending U.S. Appl. No. 10/972,653 dated Feb. 22, 2006.

Office Action in co-pending U.S. Appl. No. 10/972,653 dated Jun. 28, 2005.

Office Action in co-pending U.S. Appl. No. 10/972,653 dated Nov. 25, 2005.

Official Action dated Apr. 30, 2008 from German Patent Office for corresponding German Patent Application No. 10354208.6-34.

Official Action from Japanese Patent Office for Application No. 2003-385753, mailed Jun. 14, 2005.

Official Letter for Japanese Patent Application No. 2004-058232, issued Apr. 19, 2007 (with translation).

* cited by examiner

|         | CARD PAD NO.      | CONNECTOR PIN NO.   |
|---------|-------------------|---------------------|
| Vss     | PAD# 1.10         | : PIN# 1.10         |
| Vcc     | PAD# 9            | : PIN# 9            |
| DATA FR | PAD# 4.3.5.7.2.8  | : PIN# 4.3.5.7.2.8  |
| DATA RE | PAD# 12.11.13.14  | : PIN# 12.11.13.14  |
| INS     | PAD# 6            | : PIN# 6            |

FIG.7

MULTIPLE INTEGRATED CIRCUIT CARD CONNECTOR WITH A CARD DETECTION TERMINAL

CROSS-REFERENCES TO RELATED APPLICATIONS

This application claims the benefit of Japanese Patent Application Nos. 2009-089348, filed Apr. 1, 2009, and 2010-042651, filed Feb. 26, 2010, which are hereby incorporated by reference herein in their entirety.

BACKGROUND OF THE INVENTION

1. Field of the Invention

The present invention relates to an IC (integrated circuit) card connector which is provided with a card detection terminal and allows one of multiple IC cards with the same external dimensions to be mounted therein selectively.

2. Description of the Related Art

An electronic device such as cellular phones or digital cameras achieve enhancement of their various functions, or the like, by mounting, by way of an IC card connector, an IC card such as a MEMORY STICK (registered trademark) that has a central processing unit (CPU) or an integrated circuit for a memory embedded therein.

As disclosed in Japanese Patent No. 2,973,402, for example, such an IC card connector in actual use is provided with a card end detection switch for detecting an end of an IC card. Thus, if the card end detection switch finds that an IC card is not mounted in the IC card connector, a controller is prevented from erroneously performing the writing or deleting of data. The controller starts power supply control and data transfer control in response to a detection signal from the card end detection switch indicating that the IC card is mounted. The card end detection switch is fixed to an inner end corner portion of a card reception chamber, for example. The card end detection switch is located at one end of a row common to a row of contact terminals but is away from the contact terminals. The contact terminals come into contact with and are connected to an electrode pad of the IC card to be mounted. The card end detection switch comprises, for example, a first driven element and a second driven element respectively provided with elastic contact pieces.

A card connector which is provided with a card end detection switch separately from the contact terminals, as in the above case, has a complicated structure, and thus has a problem of requiring a large number of components because the card end detection switch needs a terminal and the like for connection to the substrate where the card connector is disposed.

To solve this kind of problem, a card connector as disclosed in Japanese Patent No. 3,713,003, for example, is proposed. In place of a card end detection switch, the card connector is provided with a card detection terminal which is arranged in parallel with and adjacent to one of multiple grounding contact terminals (hereinafter referred to as the first grounding contact terminal). A contact portion of the card detection terminal is adjacent to a contact portion of the first grounding contact terminal. The contact portion of the card detection terminal comes into contact with a common electrode pad of an IC card (hereinafter also referred to as a grounding/IC card detection electrode pad) with which the contact portion of the first grounding contact terminal also comes into contact.

Accordingly, when an IC card is inserted into the card connector, a grounding contact terminal located at a central part of the card connector first comes into contact with a grounding pad of the IC card. Next, the first grounding contact terminal comes into contact with the grounding/IC card detection electrode pad. Subsequently, a power source connection terminal and a signal line terminal come into contact with a power source electrode pad and a signal line electrode pad, respectively. Lastly, the card detection terminal comes into contact with the grounding/IC card detection electrode pad. As a result, the first grounding contact terminal and the card detection terminal make a short circuit. Accordingly, a predetermined voltage is changed so that the first grounding contact terminal and the card detection terminal have the same potential and thereby, mounting of the IC card is detected.

When multiple IC cards have the same external dimensions but are different in data transfer speed, as in the relation between a MEMORY STICK PRO DUO (registered trademark) card and a MEMORY STICK PRO-HG DUO (registered trademark) card, for example, these IC cards may often be mounted to a common card connector although having different layouts of electrode pads.

SUMMARY OF THE INVENTION

When one of the above-described multiple IC cards having the same external dimensions but being different in layouts of electrode pads is selectively mounted in a common card connector, to obtain the above configuration as shown in Japanese Patent No. 3,713,003 may be difficult. Specifically, the configuration is such that the contact portion of the card detection terminal is adjacent to a contact portion of the first grounding contact terminal and the contact portion of the card detection terminal comes into contact with a common grounding/IC card detection electrode pad of the IC card with which the contact portion of the first grounding contact terminal also comes into contact. This configuration is made to achieve commonality of layout of other contact terminals.

Moreover, in order to be implemented in an electronic device, the above-described IC card connector has to be downsized in association with downsizing of the electronic device. In this case, since there is a limitation in downsizing the card detection terminal, the layout of the contact terminals becomes an issue.

In view of the foregoing described-problems, the present invention aims to provide an IC card connector which is provided with a card detection terminal, allows one of multiple IC cards of the same external dimensions to be mounted therein selectively. The present invention can achieve downsizing.

In order to achieve the above object, an IC card connector according to the present invention comprises: a card accommodating portion configured to selectively and detachably house any one of a first IC card and a second IC card, the first and second IC cards each having a plurality of electrode pads, the first and second IC cards having data transmission speeds different from each other, the electrode pads of the first IC card being arranged at the same intervals as those at which the electrode pads of the second IC card are arranged; grounding contact terminals, respectively, for the first IC card and the second IC card, the grounding contact terminals being disposed in the card accommodating portion, the grounding contact terminals including contact portions configured to come into contact with a grounding line electrode pads of the first IC card and the second IC card when the IC card is mounted in the card accommodating portion; a first data transmission contact terminal and a second data transmission contact terminal provided in the card accommodating portion and disposed so as to be adjacent to the respective ground contact terminals and to face each other along a direction of mounting and demounting of the first IC card and the second IC card, each of the first data transmission contact terminal and the second data transmission contact terminal including a contact portion configured to come into contact with a data transmission electrode pad of a corresponding one of the first IC card and the second IC card when the corresponding IC card is mounted in the card accommodating portion; and a card detection contact terminal being provided substantially at a central part of the card accommodating portion and adjacent to the first data transmission contact terminal and the second data transmission contact terminal, the card detection contact terminal including a contact portion configured so that, when one of the first IC card and the second IC card is mounted in the card accommodating portion, the contact portion comes into contact with a card detection electrode pad of the mounted IC card, thereby detecting the mounting of the mounted IC card. In the IC card connector, when any one of the first IC card and the second IC card is inserted into the card accommodating portion, the contact portions of the grounding contact terminals are brought into contact with the grounding line electrode pads, the contact portions of the first data transmission contact terminal and the second data transmission contact terminal are then brought into contact with the data transmission electrode pads, and the contact portion of the card detection contact terminal is brought into contact with the card detection electrode pad after a lapse of a predetermined time period, thereby detecting the mounting of the inserted IC card.

The IC card connector of the present invention includes the first data transmission contact terminal and the second data transmission contact terminal disposed so as to face each other along a direction of mounting and demounting of the first IC card and the second IC card, the first data transmission contact terminal and the second data transmission contact terminal including contact portions configured to come into contact with data transmission electrode pads of the first IC card and the second IC card when the IC card is mounted in the card accommodating portion; and the card detection contact terminal being provided substantially at a central part of the card accommodating portion and adjacent to the first data transmission contact terminal and the second data transmission contact terminal, the card detection contact terminal including a contact portion configured so that, when one of the first IC card and the second IC card is mounted in the card accommodating portion, the contact portion comes into contact with a card detection electrode pad of the mounted IC card, thereby detecting the mounting of the mounted IC card. In this way, the IC card connector of the present invention achieves downsizing.

Further features of the present invention will become apparent from the following description of exemplary embodiments (with reference to the attached drawings).

BRIEF DESCRIPTION OF THE DRAWINGS

FIG. 7 is a table showing correlations between the contact terminals and the contact pads of the IC card;

DESCRIPTION OF THE EMBODIMENTS

Figure 2:
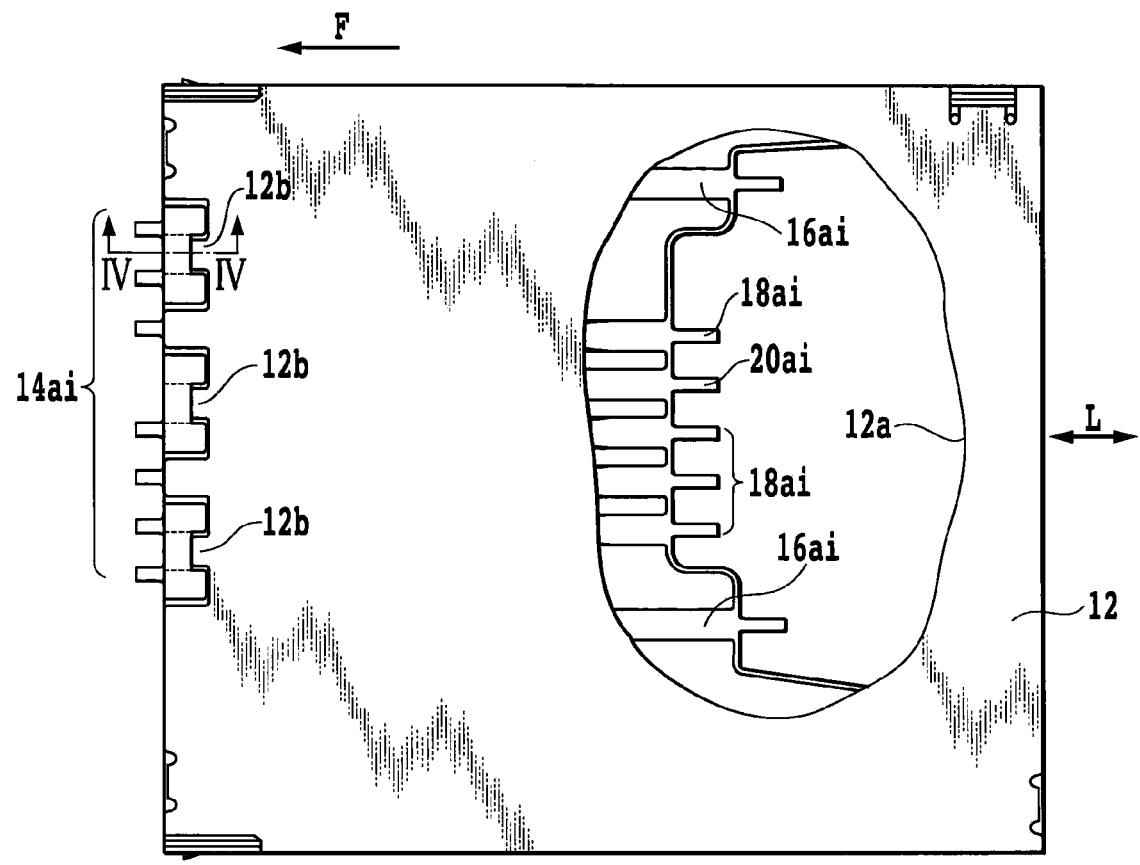
FIG. 2 is a plan view showing the external appearance of the IC card connector according to the embodiment of the present invention.

FIG. 2 shows an external view of an IC card connector according to an embodiment of the present invention.

The IC card connector in FIG. 2 is embedded in an electronic device such as a cellular phone, a telephone set, a personal digital assistant (PDA) or a camera. The IC card connector is configured to establish an electrical connection between a connection terminal of a substrate (not illustrated) for signal input-output and the like that is embedded in a given electronic device and either an electrode of a first IC card 22 (see FIG. 5A) or an electrode of a second IC card 23 (see FIG. 5B), which is detachably housed in a card accommodating portion of the IC card connector.

Figure 5A:
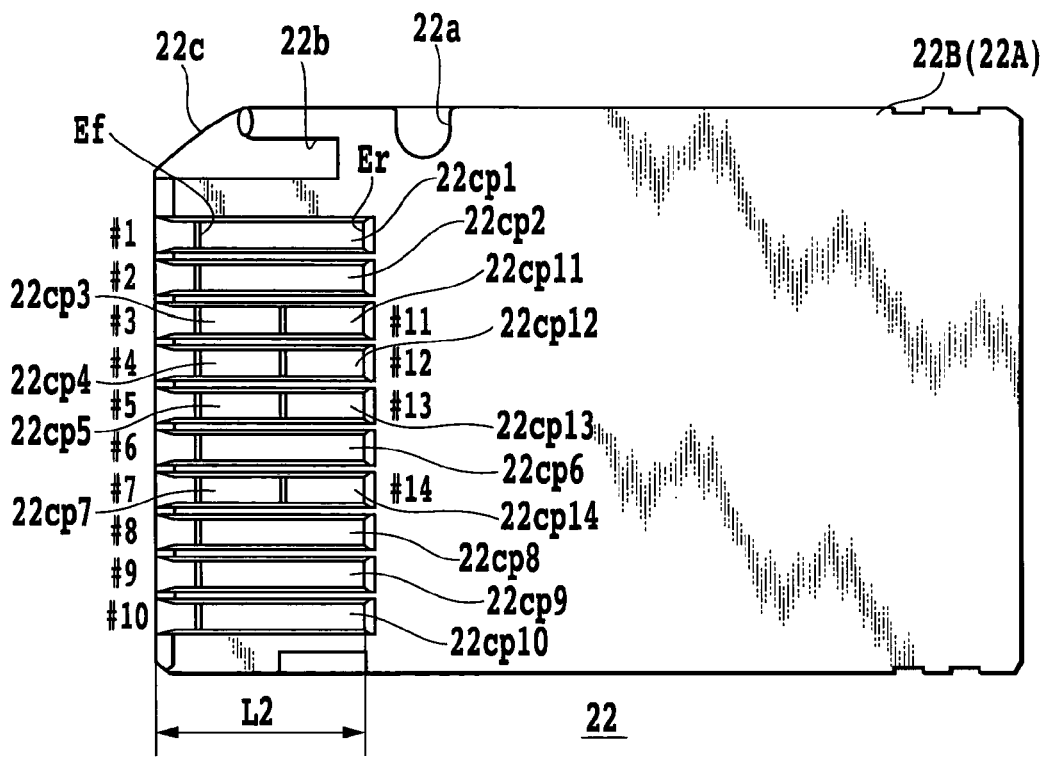
FIGS. 5A and 5B are plan views respectively showing a first IC card and a second IC card to be used in the IC card connector according to the embodiment shown in FIG. 2.

The first IC card 22 is, for example, a memory card called MEMORY STICK PRO-HG-DUO (registered trademark) as enlarged in FIG. 5A. Note that, instead of the first IC card 22, the IC card connector also allows a different memory card, for example, the second IC card 23, to be detachably mounted. The second IC card which will be described later is called MEMORY STICK PRO-DUO (registered trademark) having substantially the same external dimensions as the first IC card 22.

The plate-shaped first IC card 22 includes a front face 22A and a back face 22B, which are on opposite sides from each other as shown in FIG. 5A, for example. Note that FIG. 5A only shows the back face 22B of the first IC card 22. Moreover, the first IC card 22 includes a chamfer portion 22c located at a corner on a front end thereof.

On the back face 22B of the first IC card 22, a protrusion of a predetermined length is formed along a side face of the first IC card 22 near a relatively shallow concave portion 22b that is formed at a portion adjacent to the chamfer portion 22c. A part of an ejection member to be described later is to be engaged with a tip end of the protrusion.

Moreover, a recess 22a with which a locking member to be described later is to be engaged is formed at a portion a predetermined distance away from the protrusion on the side face of the first IC card 22. The recess 22a is formed thinner than other portions.

On the front end of the back face 22B of the first IC card 22, multiple concave portions are formed on the center side of and away from the concave portion 22b. The multiple concave portions are arranged at predetermined intervals so as to be substantially parallel to the long side of the concave portion 22b. The concave portions have widths and the lengths along the longitudinal direction of the second IC card 23 equal to one another. Adjacent concave portions are partitioned by a partition wall, and the concave portion located at the end of the row and the concave portion 22b are partitioned by a partition wall.

In FIG. 5A, a contact pad 22cp1 (#1) serving as an electrode is provided at the bottom face of the first concave portion located closest to the concave portion 22b. A contact pad 22cp2 (#2) having the same length as the contact pad 22cp1 is provided at the bottom face of the second concave portion adjacent to the first concave portion. Separated contact pad 22cp3 (#3) and contact pad 22cp11 (#11) are arranged in line having a given clearance therebetween, at a bottom face of the third concave portion. Separated contact pad 22cp5 (#5) and contact pad 22cp13 (#13) are arranged in line having a given clearance therebetween at a bottom face of the fifth concave portion. A contact pad 22cp6 (#6) having the same length as the contact pad 22cp1 is provided at a bottom face of the sixth concave portion. Separated contact pad 22cp7 (#7) and contact pad 22cp14 (#14) are arranged in line having a given clearance therebetween at a bottom face of the seventh concave portion. A contact pad 22cp8 (#8), a contact pad 22cp9 (#9), and a contact pad 22cp10 (#10) having the same length as the contact pad 22cp1 are provided at bottom faces of the eighth to tenth concave portions, respectively. End portions Ef, facing the front end side of the first IC card 22, of the contact pads 22cp1 to 22cp10 are aligned so as to be in a common straight line. End portions Er, facing the rear end side of the first IC card 22, of the contact pads 22cp1, 22cp2, 22cp6, and 22cp8 to 22cp14 are also aligned so as to be in a common straight line.

The contact pad 22cp1 (#1) and the contact pad 22cp10 (#10) are respectively used as grounding lines while the contact pad 22cp9 (#9) is used as a power source line. Meanwhile, the contact pad 22cp6 (#6) is used as a card recognition line. Moreover, the contact pads 22cp2 (#2) to 22cp5 (#5), 22cp7 (#7), 22cp8 (#8), and 22cp11 (#11) to 22cp14 (#14) are respectively used as data (signal) lines. Therefore, the contact pads are made in a 14-pin mode. Moreover, an electrode group composed of the multiple contact pads is formed in an off-centered position on the back face 22B of the first IC card 22, relative to the central axis of FIG. 5A.

Note that the reference numerals #1 to #14 are provided in FIG. 1, FIGS. 5A and 5B, and FIG. 7 for the convenience of explaining correlations between the contact pads of the IC card and the respective contact terminals described above.

Figure 5B:
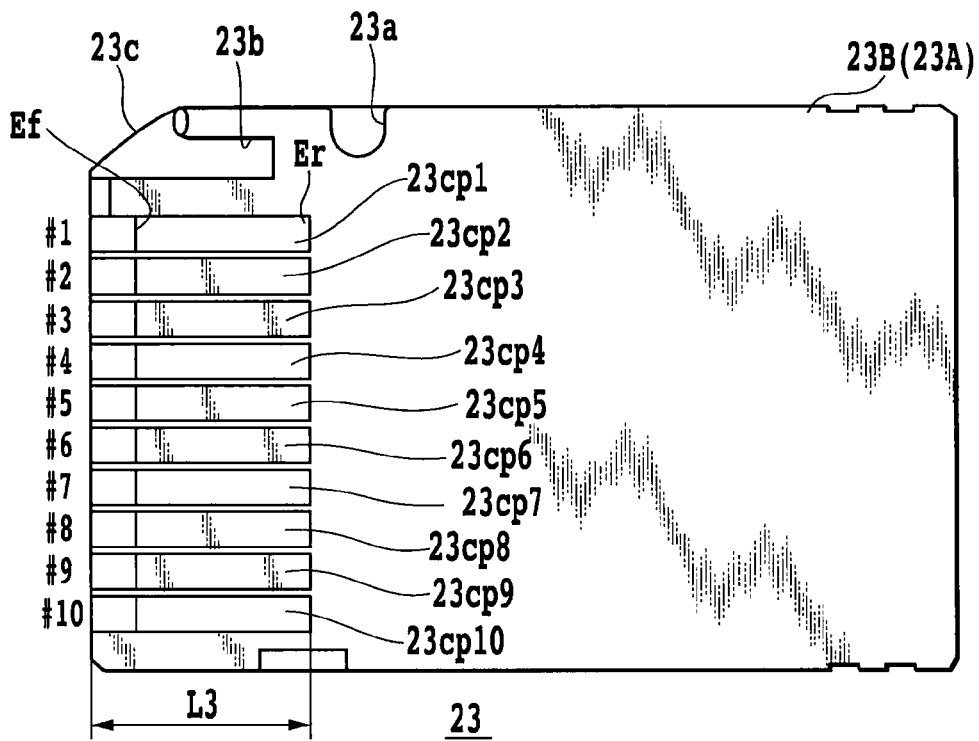

The plate-shaped second IC card 23, for example as enlarged in FIG. 5B, includes a front face 23A and a back face 23B which are on opposite sides from each other. Note that FIG. 5B only shows the back face 23B of the second IC card 23. Moreover, the second IC card 23 includes a chamfer portion 23c located at a corner on a front end thereof.

On the back face 23B of the second IC card 23, a protrusion of a predetermined length is formed along a side face of the second IC card 23 near a relatively shallow concave portion 23b that is formed at a portion adjacent to the chamfer portion 23c. A part of the ejection member to be described later is to be engaged with a tip end of the protrusion.

Moreover, a recess 23a with which the locking member to be described later is to be engaged is formed at a portion a predetermined distance away from the protrusion on the side face of the second IC card 23. The recess 23a is formed thinner than other portions.

On the front end of the back face 23B of the second IC card 23, multiple concave portions are formed on the center side of and away from the concave portion 23b. The multiple concave portions are arranged at predetermined intervals so as to be substantially parallel to the long side of the concave portion 23b. The concave portions have equal widths the lengths along the longitudinal direction of the second IC card 23. Adjacent concave portions are partitioned by a partition wall, and the concave portion located at an end of the row and the concave portion 23b are partitioned by a partition wall.

In FIG. 5B, a contact pad 23cp1 (#1) serving as an electrode unit is provided at a bottom face of the first concave portion located closest to the concave portion 23b. Contact pads 23cp2 (#2), 23cp3 (#3), 23cp4 (#4), 23cp5 (#5), 23cp6 (#6), 23cp7 (#7), 23cp8 (#8), 23cp9 (#9), and 23cp10 (#10), having the same length as the contact pad 23cp1, are provided at bottom faces of the second to tenth concave portions adjacent to the first concave portion, respectively. End portions Ef and Er of the contact pads 23cp1 to 23cp10, which face the front end side and rear end side of the second IC card 23, are respectively aligned so as to be in common straight lines. Note that the distance L3 from the front end face of the second IC card 23 to the rear end portions Er of the contact pads 23cp1 to 23cp10 is set shorter than the distance L2 from the front end face of the first IC card 22 to the rear end portions of the contact pads 22cp1, 22cp2, 22cp6, and 22cp8 to 22cp14. In other words, the length of the contact pads 23cp1 to 23cp10 of the second IC card 23 is smaller than the length of the contact pads 22cp1 to 22cp10 of the first IC card 22 as shown in FIGS. 5A and 5B. The contact pad 23cp1 (#1) and the contact pad 23cp10 (#10) are respectively used as grounding lines while the contact pad 23cp9 (#9) is used as a power source line. Meanwhile, the contact pad 23cp6 (#6) is used as a card recognition line. Moreover, the contact pads 23cp2 (#2) to 23cp5 (#5), 23cp7 (#7), and 23cp8 (#8) are each used as data (signal) lines. Therefore, the contact pads are made in a 10-pin mode. Moreover, an electrode group composed of the multiple contact pads is formed in an off-centered position on the back face 23B of the second IC card 23, relative to the central axis of FIG. 5B.

Meanwhile, the card connector includes a housing unit 10 provided with a card accommodating portion 10A configured to detachably house the first IC card 22 or the second IC card 23, and a cover member 12 configured to cover the entire housing unit 10.

Figure 3:
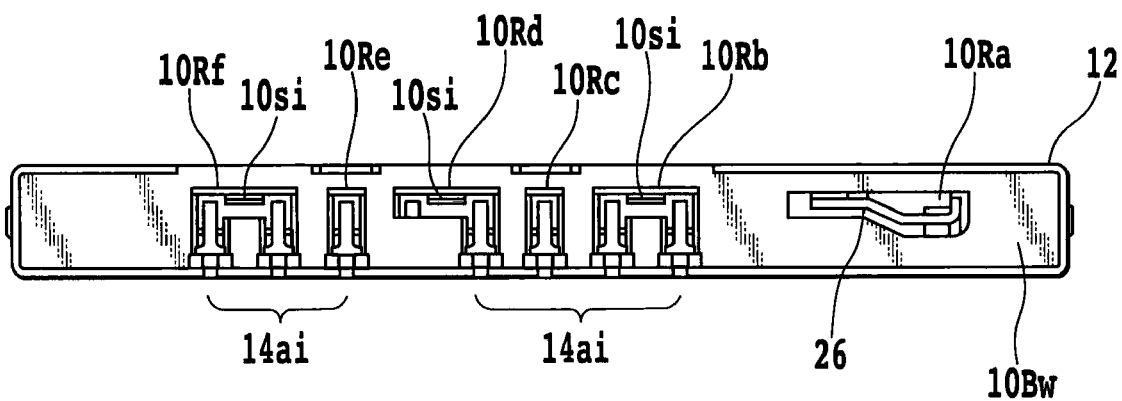
FIG. 3 is a back view of the IC card connector according to the embodiment shown in FIG. 2.
Figure 4:
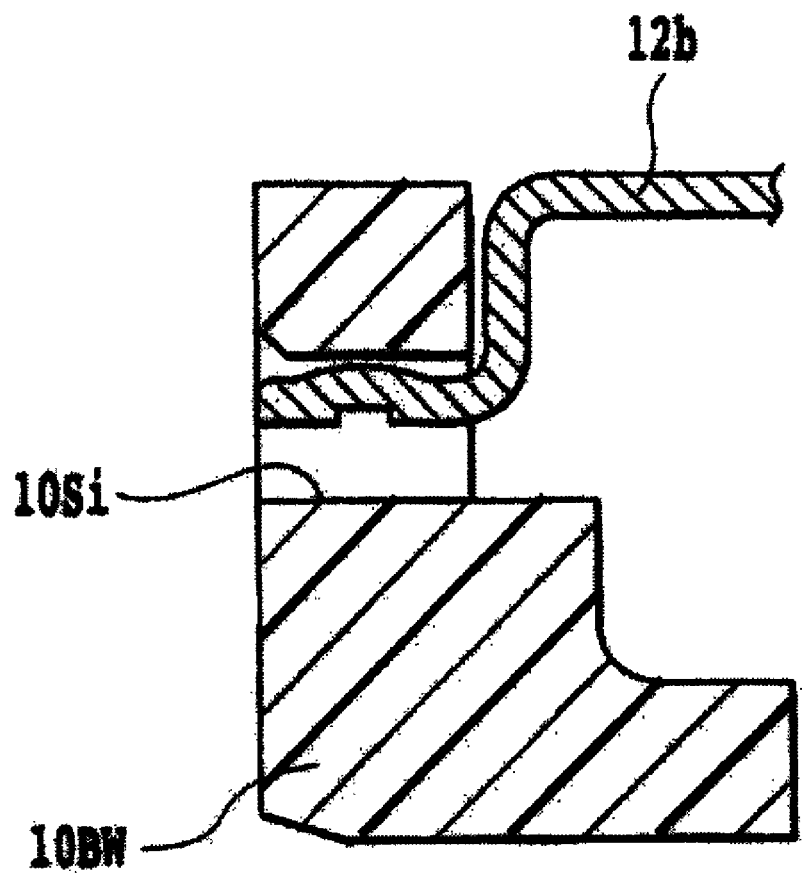
FIG. 4 is an enlarged view of a partial cross-sectional view taken along the line IV-IV of FIG. 2.

The cover member 12, having a gate-shaped cross-section, is made of a thin-plate metallic material. An aperture 12a is formed at a substantially central portion on an upper face of the cover member 12. Connector pieces 12b having bent tip ends are formed at given intervals at three locations, in a back end portion of the cover member 12 opposed to a contact terminal fixation wall 10BW of the housing unit 10 to be described later. As enlarged and shown in FIG. 4, each connector piece 12b is inserted into each slit 10Si in the contact terminal fixation wall 10BW. Holes 10Rb, 10Rc, 10Rd, 10Re, and 10Rf are formed near the slits 10Si. As shown in FIG. 3, contact terminals 14ai to be described later will be pressed into these holes, respectively. A hole 10Ra into which an ejection member 26 to be described later is inserted is formed at a position adjacent to the hole 10Rb in the contact terminal fixation wall 10BW.

Although illustration is omitted, engagement holes, with which claws 10na and 10nb of the housing unit 10 to be described later are to be respectively engaged, are formed on both sides of the cover member 12 so as to correspond to the respective claws 10na and 10nb. The ends of both sides of the cover member 12 are bent so as to hold the bottom portion of the outer face of the housing unit 10 to be described later.

Accordingly, the cover member 12 is fixed to the housing unit 10 in the following manner. Firstly, the cover member 12 is fitted to a front end of the housing unit 10 from a rear end and then caused to slide along the direction indicated with an arrow F in FIG. 2. Thereby, the claws 10na and 10nb of the housing unit 10 are respectively engaged with the engagement holes of the cover member 12. In this way, a card slot that allows either the first IC card 22 or the second IC card 23 to pass therethrough along the direction indicated with an arrow L is formed by the front end of the cover member 12 and the front end of the housing unit 10.

Figure 1:
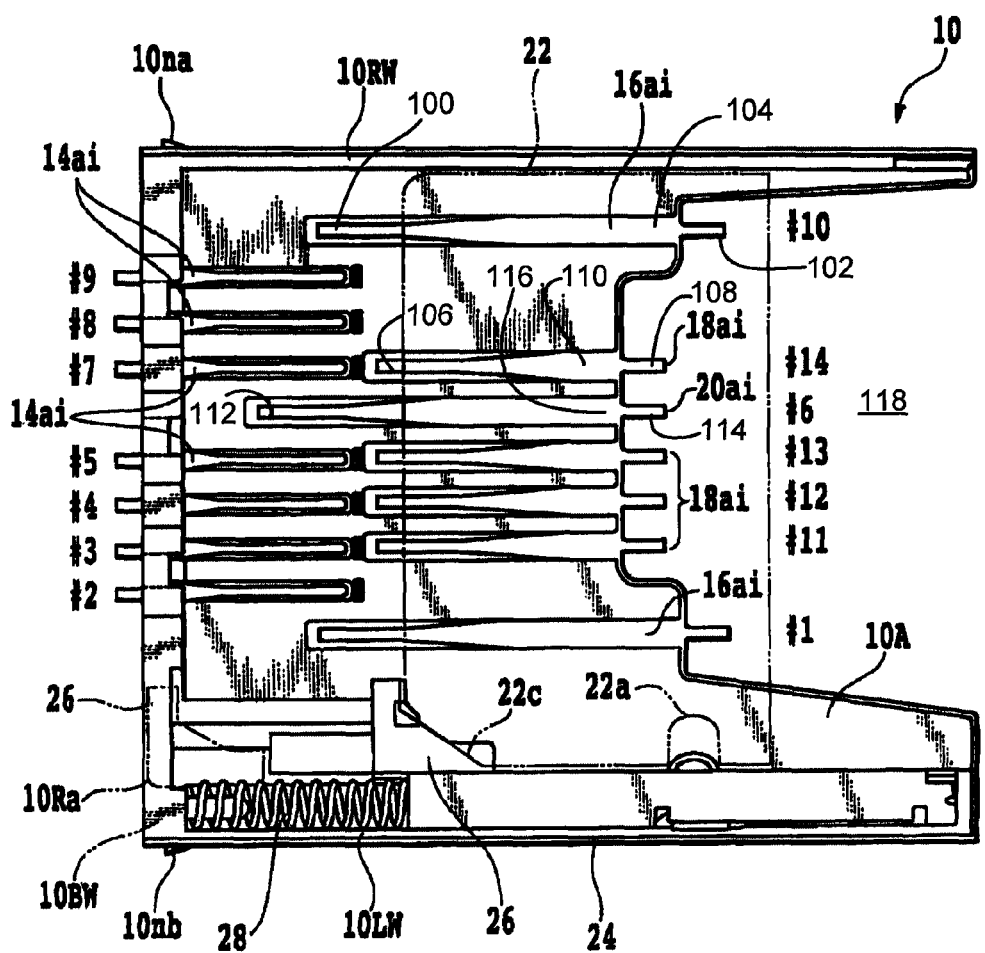
FIG. 1 is a plan view showing a housing unit in an IC card connector according to an embodiment of the present invention.

As shown in FIG. 1, in the card accommodating portion 10A of the housing unit 10, the upward portion, lower portion, and the end on the opposite side from the contact terminal fixation wall, to be described later are open The housing unit 10 is integrally formed by using a molding resin material, for example. As shown in FIG. 1, the housing unit 10 includes the card accommodating portion 10A provided inside, which is configured to detachably house the first IC card 22 or the second IC card 23. The card accommodating portion 10A is surrounded by side walls 10RW and 10LW which are opposed to each other and by the contact terminal fixation wall 10BW to which the contact terminals 14ai (i=1 to 7) are fixed.

As shown in FIG. 1, the claws 10na and 10nb are formed on the side wall 10RW and the side wall 10LW, respectively.

An ejection mechanism 24 configured to eject the first IC card 22 or the second IC card 23 selectively from the card accommodating portion 10A is provided on an inner side of the side wall 10LW.

The ejection mechanism 24 is, for example, an ejection mechanism configured to perform operations as disclosed in Japanese Patent No. 3429266 which is filed by the applicant of this specification.

The ejection mechanism 24 includes a substantially L-shaped ejection member 26, a coil spring 28, and a cam mechanism control unit (not shown). The ejection member 26 is guided by a guide groove formed at the inner portion along the side wall 10LW of the housing unit 10 and is movable relative to the housing unit 10. The coil spring 28 is interposed between an end of the contact terminal fixation wall 10BW of the housing unit 10 and the ejection member 26 and biases the ejection member 26 in a direction to eject the first IC card 22 or the second IC card 23. The cam mechanism control unit is configured to set the ejection member 26 selectively in a locked state or an unlocked state relative to the housing unit 10.

For example, as indicated with a chain double dashed line in FIG. 1, a card receiving portion, of the ejection member 26 that is formed by pressing a metallic material, is provided with an inclined portion with which the chamfer portion 22c of the inserted first IC card 22 or the chamfer portion 23c of the inserted second IC card 23 is to be engaged.

The cam mechanism control unit includes a substantially heart-shaped cam element (a heart cam), multiple lever guide grooves formed around the heart cam, a gate-shaped cam lever, and a cam pressing member (not shown). The cam element is formed at the inner portion of the side wall 10LW so as to face the end on the card slot side of the ejection member 26. The cam lever has one end supported by the ejection member 26 and having another end slidable in a predetermined direction along the lever guide grooves. The cam pressing member biases a tip end at the other end of the cam lever toward guide faces of the multiple lever guide grooves.

In this structure, when the first IC card 22 or the second IC card 23 is inserted to the card accommodating portion 10A and the ejection member 26 is pressed against the biasing force of the coil spring 28, the cam mechanism control unit brings the ejection member 26 into the locked state. In this case, the first IC card 22 or the second IC card 23 is held by the ejection member 26 as a locking member provided on the ejection member 26 is locked into a peripheral edge of the recess 22a as indicated with a chain double dashed line in FIG. 1.

In this way, the first IC card 22 or the second IC card 23 is held inside the card accommodating portion 10A and the contact pads 22cp1 to 22cp14 of the first IC card 22 or the contact pads 23cp1 to 23cp10 of the second IC card 23 described above come into contact with and are electrically connected to contact terminals 14ai, 16ai, 18ai, and 20ai to be described later.

Figure 10:
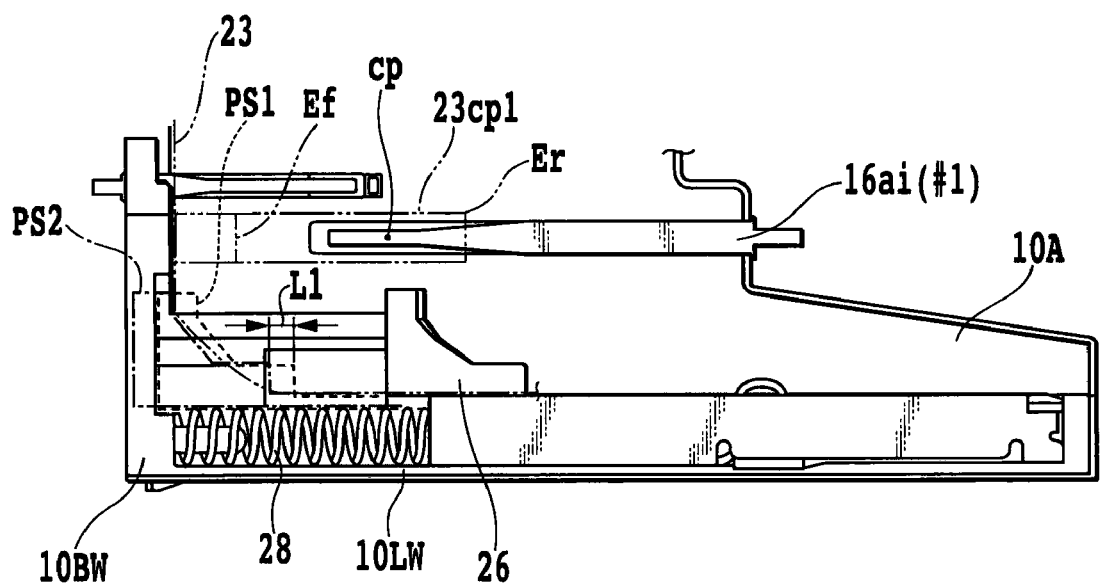
FIG. 10 is a view for explaining an operation of the IC card connector shown in FIG. 2.

On the other hand, when the first IC card 22 or the second IC card 23 is to be demounted from the card accommodating portion 10A, either the first IC card 22 or the second IC card 23 inserted therein is pressed slightly further. Accordingly, the ejection member 26 is moved by a predetermined distance L1 from a holding position PS1 to a pressed position PS2 as shown in FIG. 10 whereby the cam mechanism control unit brings the ejection member 26 into the unlocked state. Here, the predetermined distance L1 is set greater than the value L4, the difference between the distances L2 and L3 described previously (L1≧L4).

Accordingly, the ejection member 26 is moved together with the first IC card 22 or the second IC card 23 from the card accommodating portion 10A toward the card slot by the return force of the coil spring 28 and the first IC card 22 or the second IC card 23 is eventually ejected outward.

A notch 118 is formed substantially in the center on the card slot side of the bottom portion of the card accommodating portion 10A, the bottom portion being continuous with the side walls 10RW and 10LW.

Figure 9:
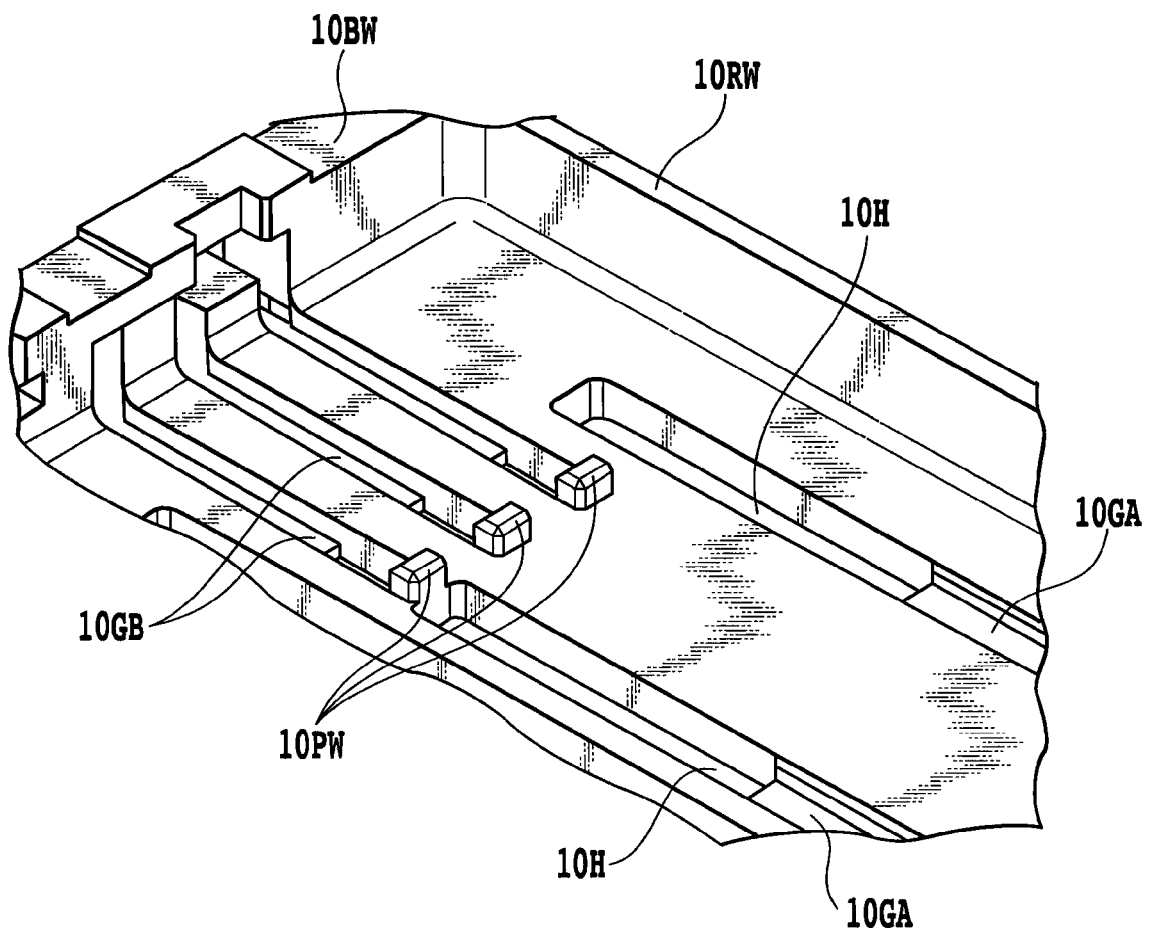
FIG. 9 is a perspective view showing an enlarged view of a principal part of the housing unit shown in FIG. 1 while detaching the contact terminals.

Moreover, first and second grounding line contact terminals 16ai (# 10, # 1) (i=1 to 2), data transfer line contact terminals 18ai (# 14, # 13, # 12, # 11) (i=1 to 4), and a card detection line contact terminal 20ai (# 6) are located on the bottom portion of the card accommodating portion 10A formed between the side walls 10RW and 10LW. The first and second grounding line contact terminals 16ai, the data transfer line contact terminals 18ai, and the card detection line contact terminal 20ai are pressed into grooves 10GA formed in the bottom portion of the card accommodating portion 10A and arranged side by side in parallel with the side wall 10RW and to the side wall 10LW. As partially enlarged and shown in FIG. 9, the grooves 10GA are formed on straight lines respectively common to long holes 10H which are formed in the bottom portion substantially parallel to the side walls 10RW and 10LW. One end of each groove 10GA extends to one edge of the corresponding hole 10H.

All the contact terminals are made of a thin plate metallic material such as phosphor bronze for spring use. The contact terminals are formed by press work, and then subjected to gold plating on surfaces thereof.

The first grounding line contact terminal 16ai is pressed into and disposed in the groove 10GA in the bottom portion of the card accommodating portion 10A, the groove 10GA located in the closest position to the side wall 10RW. The first grounding line contact terminal 16ai includes an elastic contact portion 100, a soldered terminal portion 102, and a fixation portion 104. The contact portion comes into contact with and electrically connects to either the contact pad 22*cp* 10 of the first IC card 22 or the contact pad 23*cp* 10 of the second IC card 23. The soldered terminal portion is solder-fixed to and electrically connected to an electrode of the substrate. The fixation portion joins the contact portion and the soldered terminal portion together and is fixed to the bottom portion of the card accommodating portion 10A. The soldered terminal portion protrudes into the above-described notch.

The contact portion of the first grounding line contact terminal 16*ai* extends such as to be adjacent to a contact portion of the contact terminal 14*ai* to be described later. Accordingly, when mounting or demounting the first IC card 22 or the second IC card 23, the contact portion of the first grounding line contact terminal 16*ai* reliably comes into contact with the contact pad 22*cp*10 of the first IC card 22 or the contact pad 23*cp*10 of the second IC card 23. The fixation portion of the first grounding line contact terminal 16*ai* is pressed into the groove 10GA in the bottom portion of the card accommodating portion 10A from the card slot side.

The data transfer line contact terminal 18*ai* (# 14) is adjacent to the first grounding line contact terminal 16*ai* (#10) on the side opposite from the side wall 10RW, and is apart from the first grounding line contact terminal 16*ai* with a given interval. The total length of the data transfer line contact terminal 18*ai* (# 14) is set shorter than the total length of the first grounding line contact terminal 16*ai* (#10).

Moreover, the data transfer line contact terminal 18*ai* (# 14) includes an elastic contact portion 106, a soldered terminal portion 108, and a fixation portion 110. The contact portion comes into contact with and electrically connects to either the contact pad 22*cp* 6 of the first IC card 22 or the contact pad 23*cp* 6 of the second IC card 23. The soldered terminal portion is solder-fixed to and electrically connected to the electrode unit of the substrate. The fixation portion joins the contact portion and the soldered terminal portion together and is fixed to the bottom portion. The soldered terminal portion protrudes into the above-described notch.

The total length of the card detection line contact terminal 20*ai* (# 6) adjacent to the data transfer line contact terminal 18*ai* (# 14) is set substantially equal to the total length of the above-described first grounding line contact terminal 16*ai*. However, the card detection line contact terminal 20*ai* (# 6) is arranged such that the position of the contact portion of the card detection line contact terminal 20*ai* (# 6) comes closer to the contact terminal fixation wall 10BW than the position of the contact portion of the first grounding line contact terminal 16*ai*. The card detection line contact terminal 20*ai* (# 6) includes an elastic contact portion 112, a soldered terminal portion 114, and a fixation portion 116. The contact portion comes into contact with and electrically connects to the contact pad 22*cp* 6 of the first IC card 22. The soldered terminal portion is solder-fixed to and electrically connected to the electrode unit of the substrate. The fixation portion joins the contact portion and the soldered terminal portion together and is fixed into the groove 10GA in the bottom portion of the card accommodating portion 10A. The fixation portion is pressed into a fixation groove (not shown) in the bottom portion of the card accommodating portion 10A from the card slot side.

The three data transfer line contact terminals 18*ai* (#13, #12, #11) are arranged parallel to each other adjacent to the card detection line contact terminal 20*ai* (#6). The three data transfer line contact terminals 18*ai* have the same structure, and each of the data transfer line contact terminals 18*ai* includes an elastic contact portion, a soldered terminal portion, and a fixation portion. The contact portions comes into contact with and electrically connect to either the contact pad 22*cp*13, 22*cp*12, or 22*cp*11 of the first IC card 22. The soldered terminal portions are solder-fixed to and electrically connected to the electrode unit of the substrate. The fixation portions join the contact portions and the soldered terminal portion togethers and is fixed to the bottom portion. The soldered terminal portions protrude into the above-described notch. The total lengths of the data transfer line contact terminals 18*ai* (#14, #13, #12, #11) are set equal to one another. Accordingly, the positions of the contact portions of the data transfer line contact terminals 18*ai* are located the closest to the card slot among the contact portions of all the contact terminals.

Note that the data transfer line contact terminals 18*ai* (#14, #13, #12, #11) are not used as the contact portions to be electrically connected when the second IC card 23 is inserted and held. For this reason, the data transfer line contact terminals 18*ai* (#14, #13, #12, #11) do not come into contact with the contact pads 23*cp*3 (#3) to 23*cp*5 (#5) and 23*cp*7 (#7) of the second IC card 23. Notwithstanding the aforementioned example, the data transfer line contact terminals 18*ai* (#14, #13, #12, #11) may be configured to come into contact with the contact pads 23*cp*3 (#3) to 23*cp*5 (#5) and 23*cp*7 (#7) of the second IC card 23, for example.

The second grounding line contact terminal 16*ai* (#1) has the same structure as the structure of the above-described first grounding line contact terminal 16*ai*. The second grounding line contact terminal 16*ai* includes an elastic contact portion which comes into contact with and is electrically connected to either the contact pad 22*cp*1 of the first IC card 22 or the contact pad 23*cp*1 of the second IC card 23. The second grounding line contact terminal 16*ai* is pressed into and disposed in a groove (not shown) in the bottom portion of the card accommodating portion 10A, the groove formed in the closest position to the side wall 10LW and to the ejection mechanism.

The seven contact terminals 14*ai* (i=1 to 7) are provided at given intervals on the contact terminal fixation wall 10BW of the housing unit 10. The contact terminals 14*ai* are arranged at given intervals and substantially parallel to the side walls 10RW and 10LW. The seven contact terminals 14*ai* have the same structure. For example, a power source line contact terminal 14*ai* (#9) located closest to the first grounding line contact terminal 16*ai* (#10) includes an elastic contact portion, a soldered terminal portion, and a fixation portion. The contact portion comes into contact with and electrically connects to either the contact pad 22*cp*9 of the first IC card 22 or the contact pad 23*cp*9 of the second IC card 23. The soldered terminal portion is solder-fixed to and electrically connected to the electrode unit of the substrate. The fixation portion joins the contact portion and the soldered terminal portion together and is fixed to the bottom portion of the card accommodating portion 10A of the housing unit 10.

Likewise, each of the other adjacent contact terminals 14*ai* (#8 to #2) include an elastic contact portion which comes into contact with and is electrically connected to any one of the contact pads 22*cp*8, 22*cp*7, 22*cp*5, 22*cp*4, 22*cp*3, and 22*cp*2 of the first IC card 22 or any one of the contact pads 23*cp*8, 23*cp*7, 23*cp*5, 23*cp*4, 23*cp*3, and 23*cp*2 of the second IC card 23.

The total length of the contact terminal 14*ai* (#9) is set such that the contact portion of the first grounding line contact terminal 16*ai* (#10) is arranged between the contact terminal 14*ai* (#9) and the side wall 10RW and overlaps with the contact terminal 14*ai* (#9) on a common plane.

Contact terminals 14*ai* (#7, #5, #4, #3) are respectively disposed on a common straight line to face the corresponding data transfer line contact terminals 18*ai* (#14, #13, #12, #11)

at a given interval. As enlarged and shown in FIG. 9, wrong insertion preventing walls 10PW are formed so as to protrude to the bottom portion respectively at positions between the contact portions of the contact terminals 14*ai* and the corresponding contact portions of the data transfer line contact terminals 18*ai*.

Each of the wrong insertion preventing walls 10PW is formed to have a slightly smaller width than the width of each of the contact pads of the first IC card 22 or the second IC card 23 described above. Moreover, the wrong insertion preventing walls 10PW are formed to have a height which is smaller than the height from the back face 22B of the first IC card 22 or the back face 23B of the second IC card 23 to the surface of each contact pad and is larger than the height position of the front end of the contact portion of each contact terminal 14*ai*. Accordingly, if the first IC card 22 or the second IC card 23 is inserted into the card accommodating portion 10A in the wrong direction, the front end of the first IC card 22 or the second IC card 23 will come into contact with the wrong insertion preventing walls 10PW. Thus further insertion can be prevented. Hence it is possible to prevent the contact terminals 14*ai* of the first IC card 22 or the second IC card 23 from being broken.

In the case of comparing the contact terminals 14*ai* (#7, #5, #4, #3) and the data transfer line contact terminals 18*ai* (#14, #13, #12, #11), the total lengths and the widths of the data transfer line contact terminals 18*ai* (#14, #13, #12, #11) are formed longer and wider than the total lengths and the widths of the contact terminals 14*ai*. Accordingly, a predetermined contact pressure is evenly applied to the contact pads of the first IC card 22 by the contact portions of the contact terminals arranged on the common straight line.

The card detection line contact terminal 20*ai* (#6) is arranged between the two contact terminals 14*ai* (#7, #5) such that the contact portion of the card detection line contact terminal 20*ai* overlaps with the two contact terminals 14*ai* (#7, #5) a on a single common plane. The card detection line contact terminal 20*ai* (#6) is connected to a given reference power source unit (not shown).

The total length of the contact terminal 14*ai* (#2) is set such that the contact portion of the second grounding line contact terminal 16*ai* (#1) is arranged between the side wall 10LW and the contact terminal 14*ai* (#2) and overlaps with the contact terminal 14*ai* (#2) on a single common plane.

The fixation portion of each contact terminal 14*ai* is pressed into a groove 10GB (see FIG. 9) formed in the contact terminal fixation wall 10BW via a through hole formed in the contact terminal fixation wall 10BW, and is thereby fixed to the housing unit 10.

In the above-described configuration, for the mounting of the first IC card 22, when the first IC card 22 is inserted into the card accommodating portion 10A through the card slot in the first place as indicated with the chain double dashed line in FIG. 1, the chamfer portion 22*c* of the first IC card 22 is engaged with the card receiver of the ejection member 26 and the first IC card 22 is caused to advance further.

Figure 6:
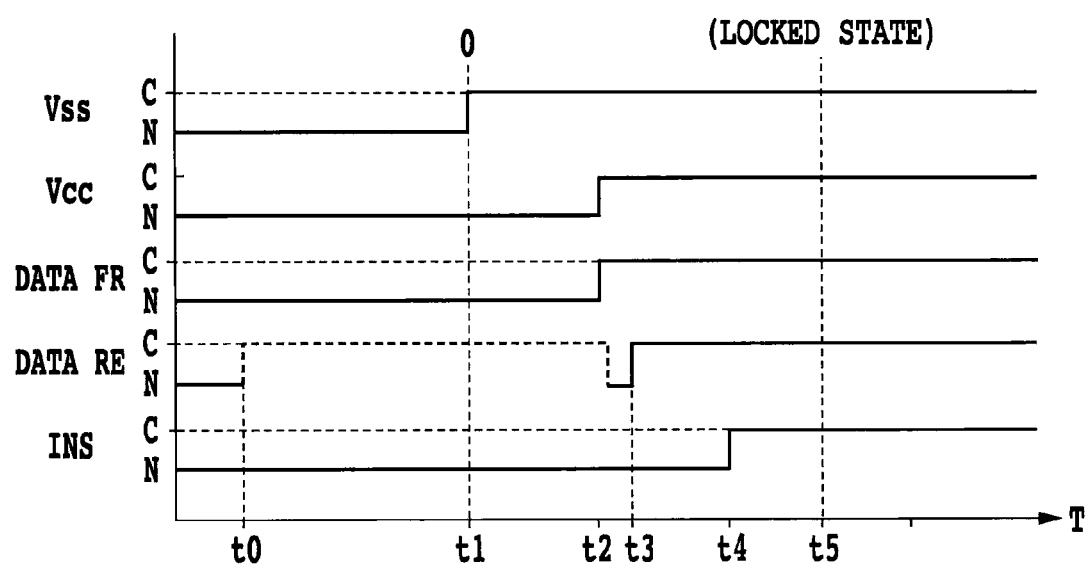
FIG. 6 is a chart showing timing when contact portions of contact terminals come into contact with contact pads of an IC card in the IC card connector according to the embodiment shown in FIG. 2.

As shown in FIG. 6, at a time t0 when the first IC card 22 is inserted into the card accommodating portion 10A through the card slot, the contact pads 22*cp*3, 22*cp*4, 22*cp*5, and 22*cp*7 of the first IC card 22 start sliding contact with the data transfer line contact terminals 18*ai* (#11, #12, #13, #14) (DATA RE). Then, at a time t1, the contact portions of the first grounding line contact terminal 16*ai* (#1) and the second grounding line contact terminal 16*ai* (#10) respectively come into contact with the contact pads 22*cp*1 and 22*cp*10 of the first IC card 22.

Note that FIG. 6 shows contact timing when the contact portions of the contact terminals come into contact with the contact pads of the first IC card 22. In FIG. 6, the vertical axis indicates the types of the contact terminals (the grounding line contact terminal: Vss, the power source line contact terminal: Vcc, the data transfer line contact terminals: DATA FR, DATA RE, and the card detection terminal: INS) while the horizontal axis indicates times T. Reference code C denotes a contact state of the contact portion of each contact terminal with the contact pad while reference code N denotes a non-contact state of the contact portion of each contact terminal with the contact pad. FIG. 7 shows correlations between the contact terminals and the contact pads.

Next, at a time t2, the contact portion of the power source line contact terminal 14*ai* (#9) comes into contact with the contact pad 22*cp*9 of the first IC card 22 and the contact portions of the multiple data transfer contact terminals 14*ai* (#2 to #5, #7, #8) respectively come into contact with the contact pads 22*cp*2 to 22*cp*5, 22*cp*7, and 22*cp*8 of the first IC card 22 substantially at the same time.

Subsequently, as the first IC card 22 is pressed further, at a time t3 shortly after the time t2, the contact portions of the multiple data transfer contact terminals 18*ai* (#11 to #14) respectively come into contact with the contact pads 22*cp*11 to 22*cp*14 of the first IC card 22 substantially at the same time. Subsequently, at a time t4 after a lapse of a predetermined period from the time t3, the contact portion of the card detection line contact terminal 20*ai* (#6) comes into contact with the contact pad 22*cp*6 of the first IC card 22. Accordingly, a predetermined potential at the contact portion of the card detection line contact terminal 20*ai* (#6) is changed to a potential at the first and second grounding contact terminals 16*ai*. Hence it is detected that the first IC card 22 has been mounted.

Then, at a time t5 after a lapse of a predetermined period from the time t4, the first IC card 22 is pressed further together with the ejection member 26 against the biasing force of the coil spring 28. When the pressure is released, one end of the cam lever (not shown) is engaged with a cam surface which is formed in the guide groove. Therefore, at the time t5, the cam mechanism control unit brings the ejection member 26 holding the first IC card 22 into the locked state.

On the other hand, when the first IC card 22 is to be dismounted from the card accommodating portion 10A, the inserted first IC card 22 is first pressed slightly further. Here, with the advancement of the ejection member 26 by the above-described predetermined distance L1, the end of the cam lever is released and detached from the cam surface and then moved to the guide groove. Accordingly, the ejection member 26 is caused to retract together with the first IC card 22 by means of the biasing force of the coil spring 28. Therefore, the cam mechanism control unit brings the ejection member 26 into the unlocked state and thus the IC card is ejected. Here, even when the end of the cam lever is located farthest from the cam surface, i.e., even when the ejection member 26 is located in the position indicated with the chain double dashed line in FIG. 1 or in the pressed position PS2 in FIG. 10 and is thus inserted into the hole 10Ra (in a fully pressed state), the contact portions of the contact terminals keep sliding contact with the corresponding contact pads of the first IC card 22 without being detached from the contact pads.

Meanwhile, in the above-described configuration, for the mounting of the second IC card 23, when the second IC card 23 is first inserted into the card accommodating portion 10A through the card slot as indicated with the chain double dashed line in FIG. 1, the chamfer portion 23*c* of the second IC card 23 is engaged with the card receiver of the ejection member 26 and the second IC card 23 is caused to advance further.

When the second IC card 23 is inserted into the card accommodating portion 10A through the card slot, the contact pads 23cp3, 23cp4, 23cp5, and 23cp7 of the second IC card 23 start sliding contact with the contact portions of the data transfer line contact terminals 18ai (#11, #12, #13, #14), respectively. As the second IC card 23 is inserted further, the contact portions of the first grounding line contact terminal 16ai (#1) and the second grounding line contact terminal 16ai (#10) respectively come into contact with the contact pads 23cp1 and 23cp10 of the second IC card 23.

Subsequently, as the second IC card 23 is inserted further, the contact portion of the power source line contact terminal 14ai (#9) comes into contact with the contact pad 23cp9 of the second IC card 23. Meanwhile, the contact portions of the multiple data transfer contact terminals 14ai (#2 to #5, #7, #8) respectively come into contact with the contact pads 23cp2 to 23cp5, 23cp7, and 23cp8 of the second IC card 23 substantially at the same time.

Subsequently, as the second IC card 23 is pressed further, the contact portion of the card detection line contact terminal 20ai (#6) comes into contact with the contact pad 23cp6 of the second IC card 23. Accordingly, a predetermined potential at the contact portion of the card detection line contact terminal 20ai (#6) is changed to a potential at the first and second grounding contact terminals 16ai. Hence it is detected that the second IC card 23 has been mounted.

Then, the second IC card 23 is pressed further together with the ejection member 26 against the biasing force of the coil spring 28. When the pressure is released thereafter, one end of the cam lever (not shown) is engaged with the cam surface which is formed in the guide groove. Therefore, the cam mechanism control unit brings the ejection member 26 holding the second IC card 23 into the locked state.

On the other hand, when the second IC card 23 is to be demounted from the card accommodating portion 10A, the inserted second IC card 23 is first pressed slightly. Here, with the advancement of the ejection member 26 by the above-described predetermined distance L1, the end of the cam lever is released and detached from the cam surface and then moved to the guide groove. Accordingly, the ejection member 26 is caused to retract together with the second IC card 23 by means of the biasing force of the coil spring 28. Therefore, the cam mechanism control unit brings the ejection member 26 into the unlocked state and thus the second IC card 23 is ejected.

Here, even when the end of the cam lever is located farthest from the cam surface, i.e., even when the ejection member 26 is located in the position indicated with the chain double dashed line in FIG. 1 or in the pressed position PS2 in FIG. 10 from the holding position PS1 and thus is inserted to the hole 10Ra (in a fully pressed state), the contact portions of the first grounding line contact terminal 16ai (#1), the second grounding line contact terminal 16ai (#10), the contact terminals 14ai (#7, #5, #4, #3), the power source line contact terminal 14ai (#9), and the card detection line contact terminal 20ai keep sliding contact with the corresponding contact pads of the second IC card 23 without being detached from the contact pads.

Here, assume a case where the moving distance L1 of the ejection member 26 from the above-described holding position PS1 to the pressed position PS2 is greater than the difference value L4 between the above-described distance L2 in the case of the first IC card 22 and the distance L3 in the case of the second IC card 23 as described previously. In this case, the contact portion of the first grounding line contact terminal 16ai (#1) and the contact portion of the second grounding line contact terminal 16ai (#10) may be respectively detached from the end portions Er (see FIG. 5B) of the corresponding contact pads of the second IC card 23, depending on the relative positions between the contact portions of the first grounding line contact terminal 16ai (#1) as well as the second grounding line contact terminal 16ai (#10) and the corresponding contact pads of the second IC card 23, when the ejection member 26 moves from the above-described holding position PS1 to the pressed position PS2 (when the second IC card 23 is pressed and the ejection member 26 is brought into the unlocked state for the ejection of the second IC card 23). Therefore, there is a risk that data and the like stored in the second IC card 23 are deleted when the contact portions of the first grounding line contact terminal 16ai (#1) and the second grounding line contact terminal 16ai (#10) are detached from the end portions Er of the corresponding contact pads of the second IC card 23.

As described previously, in this embodiment, in order to surely prevent the aforementioned risk, the positions of the contact portion CP of the first grounding line contact terminal 16ai (#1) and the contact portion of the second grounding line contact terminal 16ai (#10) are set to be located away from the rear end potions Er of the corresponding contact pad 23cp1 of the second IC card 23 by the distance L1 or more as indicated with the chain double dashed line in FIG. 10 when the ejection member 26 is in the above-described holding position PS1.

Therefore, as described above, when the first IC card 22 is mounted, the positions of the contact portion CP of the first grounding line contact terminal 16ai (#1) and the contact portion of the second grounding line contact terminal 16ai (#10) are also located away from the rear end potions Er of the corresponding contact pad 22cp1 of the first IC card 22 by the distance L1 or more when the ejection member 26 is in the above-described holding position PS1.

Here, the contact portion CP of the first grounding line contact terminal 16ai (#1) and the contact portion of the second grounding line contact terminal 16ai (#10) come into contact with the contact pad 23cp1, 23cp10 at a point earlier than the time when the contact portions of the data transfer contact terminals 14ai (#7, #5, #4, #3), the power source line contact terminal 14ai (#9), and the card detection line contact terminal 20ai respectively come into contact with the corresponding contact pads.

Accordingly, even when the position of the ejection member 26 is moved from the holding position PS1 to the pressed position PS2, none of the contact portions of the contact terminals are detached from the back end portions Er of the contact pad 22cp1 and the contact pad 23cp1. Hence it is possible to protect the data stored in the second IC card 23 reliably.

Moreover, by laying out the contact portions of the first grounding line contact terminal 16ai (#1) and the second grounding line contact terminal 16ai (#10) in the above-described positions, both the first IC card 22 and the second IC card 23 can use the first grounding line contact terminal 16ai (#1) and the second grounding line contact terminal 16ai (#10). Thus, less number of components are required than the case of laying out different grounding line contact terminals for these cards.

In the above-described embodiment, the fixation portions of the contact terminals are held by bring pressed into the corresponding fixation grooves of the housing unit 10. However, the present invention is not limited only to this configuration. For example, a housing unit 30 provided with the contact terminals may be formed by insert molding as shown in FIG. 8.

Figure 8:
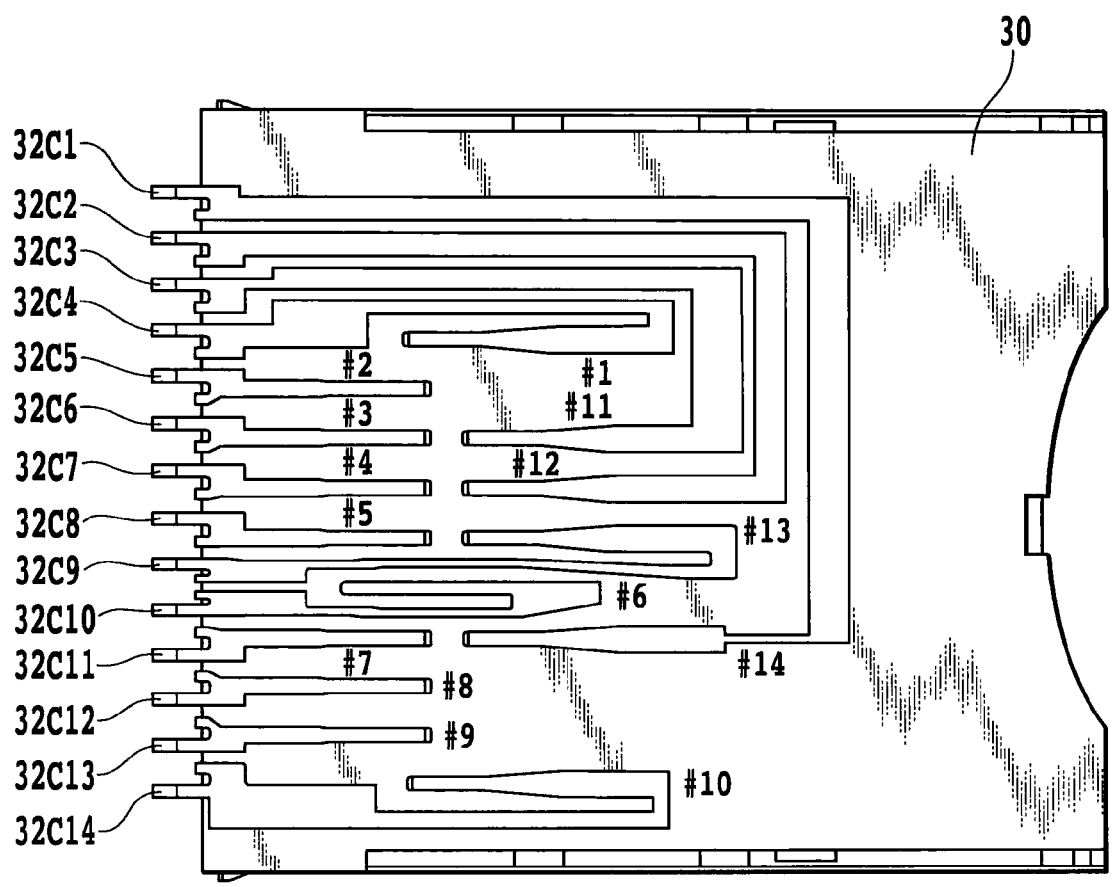
FIG. 8 is a plan view showing another example of the housing unit of the IC card connector according to the embodiment of the present invention.

The housing unit 30 shown in FIG. 8 is a reverse type housing unit. The first IC card 22 or the second IC card 23 is mounted in the housing unit 30 by being turned upside down with respect to the housing unit 30 (in the conditions as shown in FIGS. 5A and 5B). A metallic cover member is disposed below the housing unit 30. Note that FIG. 8 is a top plan view of the housing unit 30.

Soldered terminal portions of contact terminals 3201 to 32C14 protrude by the same length from an end of the housing unit 30 so that the protruded parts align with each other. In FIG. 8, reference numerals #1 to #14 denoted to the contact terminals 3201 to 32C14 conform to reference numerals denoted to the above-described contact terminals 14ai (#2 to #5, #7 to #9), the contact terminals 16ai (#1, #10), the contact terminals 18ai (#11, #12, #13, #14), and the contact terminal 20ai (#6).

Accordingly, at a portion of the housing unit 30 opposed to a card accommodating portion and formed between both side walls, first and second grounding line contact terminals 32C14, 32C4 (#10, #1), data transfer line contact terminals 32C1, 32C9, 32C2, 32C3, (#14, #13, #12, #11), 32C5, 32C6, 32C7, 32C8, 32C11, 32C12 (#2, #3, #4, #5, #7, #8), a power source line contact terminal 32C13 (#9), and a card detection line contact terminal 32C10 (#6) are arranged side by side in parallel to the side walls. Here, contact portions of the contact terminals are located away from a flat surface of the housing unit 30 by a predetermined height, the flat surface forming the card accommodating portion.

In this example as well, mounting of the first IC card 22 or the second IC card 23 is detected by use of the card detection line contact terminal 32C10 (#6) and the first and second grounding line contact terminals 32C14, 32C4 (#10, #1).

It is to be noted that, in the embodiment of the present invention, instead of the first IC card 22 or the second IC card 23, other memory cards such as the above-mentioned Memory Stick PRO-Duo (registered trademark) can also detachably mounted to the housing unit 30.

Moreover, in the embodiment of the present invention, it is possible to arrange the contact terminals densely around the card detection line contact terminal 32C10 and thereby downsize the IC card connector.

Figure 12:
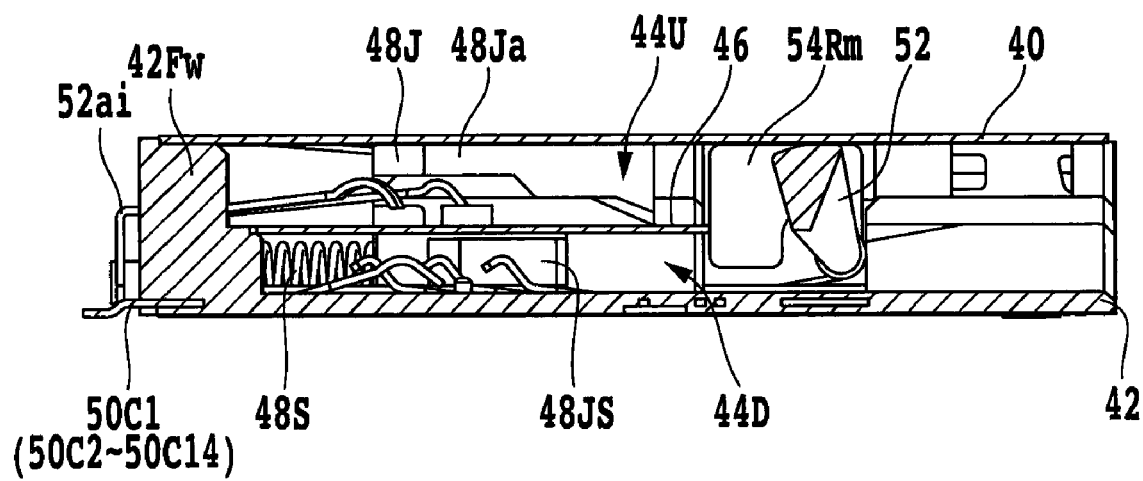
FIG. 12 is a cross-sectional view showing a principal part of the IC card connector according to another embodiment of the present invention shown in FIG. 11.

FIG. 12 shows a principal part of an IC card connector according to another embodiment of the present invention.

The IC card connector in the embodiment shown in FIG. 2 is configured to detachably mount the memory card called Memory Stick PRO-HG-Duo (registered trademark) as the first IC card 22 or the memory card called Memory Stick PRO-Duo (registered trademark) as the second IC card 23 in lieu of the first IC card 22. On the other hand, the IC card connector in the embodiment shown in FIG. 12 is configured for another card such as a Secure Digital Card (SD card) (registered trademark) (not shown) to be detachably received, in addition to the above-described first IC card 22 and the second IC card 23, being detachably received in a card accommodating portion thereof. The IC card connector in the embodiment shown in FIG. 12 electrically connects electrode units of the IC card to a connection terminal unit (not shown) of a substrate which is embedded inside a given electronic device, the connection terminal unit used for inputting and outputting signals, or other purposes.

The SD card is designed to have a thickness of about 2.1 mm and length and width of about 32 mm and about 24 mm, for example. The length and width of the first IC card 22 are smaller than the length and width of the SD card.

Note that the IC card is not limited only to the above-described SD card and may be selected from among any of a Multimedia card (MMC) card (registered trademark), a flash memory, a memory card incorporating a micro hard disk, and the like.

In FIG. 12, a cover member 40 having a gate cross-sectional shape is made of a thin-plate metallic material. Multiple engagement holes (not shown) with which multiple claws of a base member 42 are to be engaged are formed on both side faces of the cover member 40 so as to correspond to the claws.

Therefore, the cover member 40 is fixed to the base member 42 by the claws of the base member 42 engaged with the corresponding engagement holes.

A card accommodating portion of the base member 42 is open upward and at an end on the opposite side from a contact terminal fixation portion to be described later. The card accommodating portion is a composite card accommodating portion. The card accommodating portion houses the SD card in an upper side portion 44U and houses the first IC card 22 or the second IC card 23 in a lower side portion 44D which partially overlaps the upper side portion 44U.

By covering the base member 12 with the above-described cover member 10, a common card slot which selectively allows one of the SD card, the first IC card 22, and the second IC card 23, among IC cards, to pass through one end of the card accommodating portion.

Although illustration is omitted, an open end serving as the common card slot has a stepped cross section including a first guide portion and a second guide portion corresponding to the shapes of the SD card, the first IC card 22, and the second IC card 23 to be inserted thereto.

Accordingly, a front end, in the direction of travel, of any one of the SD card, the first IC card 22, and the second IC card 23 passes to the upper side or the lower side of the card accommodating portion while being guided by the first guide portion or the second guide portion as appropriate.

An ejection mechanism is formed on an inner side of the side wall of the base member 42. The ejection mechanism holds any one of the SD card, the first IC card 22, and the second IC card inside the card accommodating portion and selectively ejects the held one of the IC cards from the card accommodating portion.

The ejection mechanism includes an ejector member 48J, a coil spring 48S, and a ejection member control unit. The ejector member 48J is supported by the base member 42 and in a movable manner with respect to the base member 42 selectively holds one of the IC cards. The coil spring 48S is interposed between a wall adjacent to the contact terminal fixation wall unit of the base member 42 and the ejector member 48J and biases the ejector member 48J in a direction to eject the IC card. The ejection member control unit performs control to hold or to release the ejector member 48J to or from the base member 42 selectively in response to an mounting or demounting operation exerted on the IC card.

The ejection member control unit includes a substantially heart-shaped cam element (a heart cam), a lever guide groove, a gate-shaped cam lever, and a pressing spring, as disclosed in Japanese Patent Laid-Open No. 2004-311416, for example. The substantially heart-shaped cam element is formed on the side wall side of the ejector member 48J. The lever guide groove includes multiple step portions formed around the heart cam. The cam lever has one end connected to a hole on the side wall and the other end caused to slide along the lever guide groove. The pressing spring is formed on the above-described cover member 40.

The ejector member 48J includes a first card receiver 48Ja provided on an upper end adjacent to the heart cam. The first card receiver 48Ja receives an inclined chamfer portion at a front end portion of the SD card located at the upper side portion 44U in FIG. 12. Meanwhile, a second card receiver 48JS is formed at a portion of the ejector member 48J located below the first card receiver 48Ja. The second card receiver 48JS receives a corner portion opposed to chamfer portions formed at front ends of the first IC card 22 and the second IC card 23 located at the lower side portion 14D in FIG. 12.

The base member 42 is integrally formed by using a molding resin material, for example. The base member 42 includes side walls (see FIG. 11) and a contact terminal fixation wall unit 42FW. The side walls respectively form side portions of the card accommodating portion which detachably houses the SD card, the first IC card 22, and the second IC card 23. The contact terminal fixation wall unit 42FW is provided with contact terminals 50C1 to 50C14 used for the first IC card 22 and the second IC card 23, contact terminals $52ai$ (i=1 to 9) used for the SD card, and other contact terminals $54ai$.

For example, the multiple contact terminals $52ai$ are arranged side by side with given intervals substantially in parallel to the side walls. The multiple contact terminals $52ai$ are located at respective portions (the upper side portion 44U) close to the contact terminal fixation wall unit 42FW in the card accommodating portion.

The upper side portion 44U and the lower side portion 44D are partitioned by a partition plate 46 which is integrally formed with and fixed to the contact terminal fixation wall unit 42FW. The flat partition plate 46 is formed substantially parallel to a bottom face portion of the base member 42 and a front end on the card slot side extends into a rotating area of a wrong insertion regulating member 52. The partition plate 46 includes slits (not shown) each of which allows, at the time of inserting the SD card, a tip end of a contact portion of each contact terminal $52ai$ pressed down to be inserted therein.

The tip ends of the contact portions of the contact terminals $52ai$ are laid out so as not to come into contact with some of the contact terminals, 50C1 to 50C14, arranged below the slit. Accordingly, this arrangement allows reduction in thickness of the partition plate 46, and thus is effective for downsizing the connector. Moreover, a protrusion piece (not shown) for preventing wrong insertion is formed on an edge of the given slit. The protrusion piece protrudes by a predetermined height toward the cover member 40. The protrusion piece regulates insertion of the SD card because an end of the SD card inserted in a wrong direction comes into contact with the protrusion piece. Accordingly, the protrusion piece is configured to prevent so-called upside-down insertion or front-to-back insertion of the SD card.

Each of the contact terminals $52ai$ includes an elastic contact portion, a soldered terminal portion, and a fixation portion. The contact portion comes into contact with and electrically connects to a contact pad of the SD card. The soldered terminal portion is solder-fixed to and electrically connects to the electrode of a wiring substrate (not shown). The fixation portion joins the contact portion and the soldered terminal portion together and is fixed to the base member 42. Although illustration is omitted, the fixation portion of the contact terminal $52ai$ made of a thin-plate metallic material such as phosphor bronze for spring use, for example, is pressed into a groove formed in the contact terminal fixation wall unit 42FW via a through hole formed in the contact terminal fixation wall unit 42FW in an opposite direction from the direction of insertion of the SD card, and is thereby fixed to the base member 42.

Figure 11:
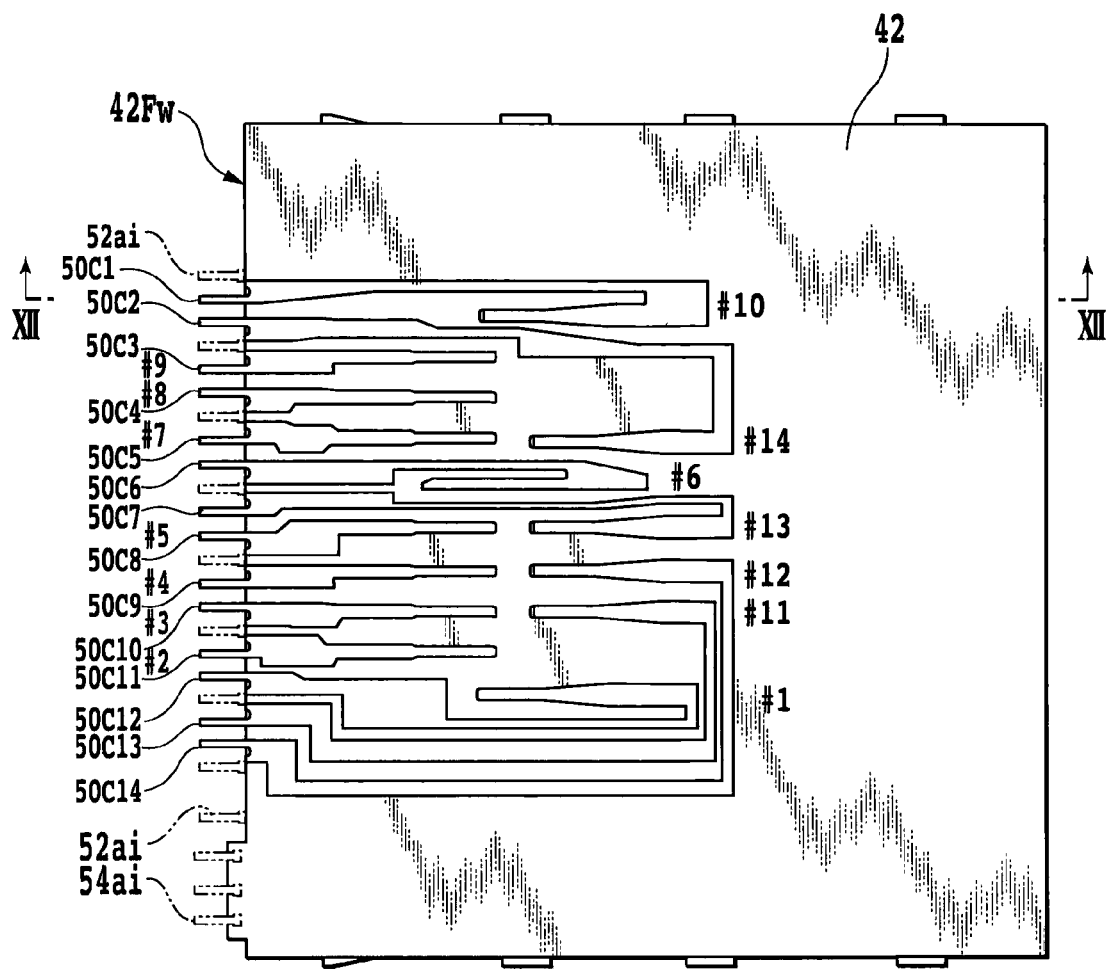
FIG. 11 is a plan view showing a layout of contact terminals to be disposed on a base member of an IC card connector according to another embodiment of the present invention.

Meanwhile, as shown in FIG. 11, the multiple contact terminals 50C1 to 50C14 are arranged side by side with given intervals substantially in parallel to the side walls. The multiple contact terminals 50C1 to 50C14 are located at respective portions in the lower side portion 44D close to the contact terminal fixation wall 42FW in the card accommodating portion and below the upper side portion 44U. All the contact terminals 50C1 to 50C14 are made of a thin-plate metallic material such as phosphor bronze for spring use, formed by press work, and then subjected to gold plating on surfaces thereof. Fixation units of the respective contact terminals 50C1 to 50C14 are formed by insert molding on the bottom portion of the base member 42. Note that FIG. 11 schematically shows the layout of the multiple contact terminals 50C1 to 50C14 arranged inside the bottom portion of the base member 42.

In FIG. 11, in the bottom portion of the card accommodating portion formed between the side walls opposed to each other, first and second grounding line contact terminals 50C1, 50C12 (#10, #1), data transfer line contact terminals 50C2, 50C7, 50C14, 50C13 (#14, #13, #12, #11), (i=1 to 4), and a card detection line contact terminal 50C6 (#6) are arranged side by side in parallel to the side walls and are formed by insert molding.

The first grounding line contact terminal 50C1 (#10) is disposed at a position closest to the side wall in the bottom portion of the card accommodating portion. The first grounding line contact terminal 50C1 includes an elastic contact portion, a soldered terminal portion, and a fixation portion. The contact portion comes into contact with and electrically connected to the contact pad $22cp10$ of the first IC card 22 or the contact pad $23cp10$ of the second IC card 23. The soldered terminal portion is solder-fixed to and electrically connected to the electrode unit of the substrate. The fixation portion joins the contact portion and the soldered terminal portion together and is fixed to the bottom portion. The soldered terminal portion protrudes outward from the contact terminal fixation wall 42FW.

The contact portion of the first grounding line contact terminal 50C1 protrudes and extends upward from the bottom portion so as to be adjacent to a contact portion of the contact terminal 50C3, to be described, with the contact terminal 50C2 interposed in between. Accordingly, when mounting the first IC card 22 or the second IC card 23, the contact portion of the first grounding line contact terminal 50C1 reliably comes into contact with either the contact pad $22cp10$ of the first IC card 22 or the contact pad $23cp10$ of the second IC card 23.

The fixation portion of the first grounding line contact terminal 50C1 is formed in the inner side on the bottom portion so as to extend along the side walls.

The data transfer line contact terminal 50C2 (#14) is adjacent to the first grounding line contact terminal 50C1 with a given interval in between on a side of the first grounding line contact terminal 50C1, the side located away from the side wall. The total length of the data transfer line contact terminal 50C2 (#14) is set larger than a total length of the first grounding line contact terminal 50C1.

Meanwhile, the data transfer line contact terminal 50C2 (#14) includes an elastic contact portion, a soldered terminal portion, and a fixation portion. The contact portion comes into contact with and electrically connects to the contact pad $22cp10$ of the first IC card 22. The soldered terminal portion is solder-fixed to and electrically connected to the electrode unit of the substrate. The fixation portion joins the contact portion and the soldered terminal portion together and is fixed to the bottom portion of the lower side portion 44D of the card accommodating portion. The soldered terminal portion of the data transfer line contact terminal 50C2 is adjacent to the soldered terminal portion of the above-described first grounding line contact terminal 50C1 and protrudes outward from the contact terminal fixation wall 42FW. The fixation portion of the data transfer line contact terminal 50C2 passes through a space between a power source line contact terminal 50C3 (#9), to be described later, and the first grounding line contact terminal 50C1, extends toward the card slot, and then is bent in a direction to separate from the side wall so as to form an almost gate shape.

The total length of the card detection line contact terminal 50C6 (#6) adjacent to the data transmission line contact terminal 50C2 (#14) is set smaller than the above-described first grounding line contact terminal 50C1.

The card detection line contact terminal 50C6 (#6) includes an elastic contact portion, a soldered terminal portion, and a fixation portion. The contact portion comes into contact with and electrically connects to the contact pad 22$cp$6 of the first IC card 22. The soldered terminal portion is solder-fixed to and electrically connected to the electrode unit of the substrate. The fixation portion joins the contact portion and the soldered terminal portion together and is fixed to the bottom portion.

The card detection line contact terminal 50C6 (#6) is located such that the position of the contact portion of the card detection line contact terminal 50C6 (#6) comes closer to the contact terminal fixation wall 42FW than the position of the contact portion of the first grounding line contact terminal 50C1. The soldered terminal portion of the card detection line contact terminal 50C6 (#6) is disposed between and adjacent to the data transfer line contact terminal 50C7 to be described later and the contact terminal 50C5. The fixation portion of the card detection line contact terminal 50C6 (#6) is located in the bottom portion of the lower side portion 44D of the card accommodating portion.

Meanwhile, the three data transfer line contact terminals 50C7, 50C14, and 50C13 (#13, #12, #11) are arranged adjacent to the card detection line contact terminal 50C6 (#6). The positions of the contact portions of the three data transfer line contact terminals 50C7, 50C14, and 50C13 are arranged on a common straight line which is parallel to a direction of arrangement of the contact terminals. Each of the data transfer line contact terminals 50C7, 50C14, and 50C13 includes an elastic contact portion, a soldered terminal portion, and a fixation portion. The contact portion comes into contact with and electrically connects to either one of the contact pads 22$cp$13, 22$cp$12, and 22$cp$11 of the first IC card 22. The soldered terminal portion is solder-fixed to and electrically connected to the electrode unit of the substrate. The fixation portion joins the contact portion and the soldered terminal portion together and is fixed to the bottom portion.

The soldered terminal portions of the three data transfer line contact terminals 50C7, 50C14, and 50C13 protrude outward from the contact terminal fixation wall 42FW. The soldered terminal portions of the data transfer line contact terminals 50C14 and 50C13 are adjacent to each other, and the soldered terminal portion of the data transfer line contact terminal 50C13 is adjacent to the soldered terminal portion of the second grounding line contact terminal 50C12 (#1) to be described later.

The fixation portion of the data transfer line contact terminal 50C7 (#13) passes through a space between the card detection line contact terminal 50C6 (#6) and the contact terminal 50C8 to be described later, extends toward the card slot, and then is bent in a direction to separate from one of the side walls so as to form an almost gate shape.

On the other hand, the fixation portions of the data transfer line contact terminals 50C14 and 50C13 (#12, #11) are formed substantially parallel to each other, and extend toward the card slot. The fixation portions of the data transfer line contact terminals 50C14 and 50C13 are then bent in a direction to separate from the other one of the side walls so as to form an almost gate shape and so as to surround the second grounding line contact terminal 50C12 (#1).

Accordingly, the positions of the contact portions of the data transfer line contact terminals 50C2, 50C7, 50C14, and 50C13 (#14, #13, #12, #11) are located closest to the card slot among all the contact portions of all the contact terminals and are arranged on a common straight line along the direction of arrangement of the contact terminals.

Note that when the second IC card 23 is inserted and held in the card accommodating portion, the data transfer line contact terminals 50C2, 50C7, 50C14, and 50C13 (#14, #13, #12, #11) are not used as the electrically connected contact portions. For this reason, the data transfer line contact terminals 50C2, 50C7, 50C14, and 50C13 (#14, #13, #12, #11) do not come into contact with any one of the contact pads 23$cp$3 (#3) to 23$cp$5 (#5) and 23$cp$7 (#7) of the second IC card 23. Notwithstanding the aforementioned example, the data transfer line contact terminals 50C2, 50C7, 50C14, and 50C13 (#14, #13, #12, #11) may be configured to come into contact with the contact pads 23$cp$3 (#3) to 23$cp$5 (#5) and 23$cp$7 (#7) of the second IC card 23, for example.

The second grounding line contact terminal 50C12 (#1) includes an elastic contact portion which comes into contact with and electrically connects to either the contact pad 22$cp$1 of the first IC card 22 or the contact pad 23$cp$1 of the second IC card 23. The second grounding line contact terminal 50C12 is located between the contact terminal 50C11 and the data transfer line contact terminal 50C13.

The seven contact terminals 50C3, 50C4, 50C5, and 50C8 to 50C11 (#9, #8, #7, #5, #4, #3, #2) are provided at given intervals on the contact terminal fixation wall 42FW. The contact terminals 50C3, 50C4, 50C5, and 50C8 to 50C11 are arranged side by side with given intervals and substantially in parallel to the side walls. The seven contact terminals 50C3, 50C4, 50C5, and 50C8 to 50C11 have the total lengths which are equal to one another. For example, a power source line contact terminal 50C3 (#9) located closest to the first grounding line contact terminal 50C1 (#10) includes an elastic contact portion, a soldered terminal portion, and a fixation portion. The contact portion comes into contact with and electrically connects to either the contact pads 22$cp$9 of the first IC card 22 and the contact pads 23$cp$9 of the second IC card 23. The soldered terminal portion is solder-fixed to and electrically connected to the electrode unit of the substrate. The fixation portion joins the contact portion and the soldered terminal portion together and is fixed to the bottom portion of the card accommodating portion.

Likewise, each of the other adjacent contact terminals 5004 to 50C11 (#8 to #2) includes an elastic contact portion which comes into contact and electrically connects to any one of the contact pads 22$cp$8, 22$cp$7, 22$cp$5, 22$cp$4, 22$cp$3, and 22$cp$2 of the first IC card 22 or any one of the contact pads 23$cp$8, 23$cp$6, and 23$cp$2 of the second IC card 23.

The total length of the contact terminal 50C3 (#9) is set such that the contact portion of the contact terminal 50C3 (#9) is arranged on the plane common to the contact portion of the first grounding line contact terminal 50C1 (#10) so as to overlap with the contact portion of the first grounding line contact terminal 50C1 (#10).

Each of the contact terminals 50C5, 50C8, 50C9, and 50C10 (#7, #5, #4, #3) is disposed on a common straight line so as to face each of the corresponding data transfer line contact terminals 50C2, 50C7, 50C14, and 50C13 (#14, #13, #12, #11) at a given interval.

Accordingly, in this configuration as well, even when the position of the ejection member is moved from the aforementioned holding position PS1 to the pressed position PS2, none of the contact portions of the contact terminals are detached from the back end portions Er of the contact pad 22cp1 and the contact pad 23cp1 as in the above-described embodiment. Hence, this configuration allows reliable protection of data stored in the second IC card 23. Moreover, since bent portions of the data transfer line contact terminals 50C2, 50C7, and 50C14 (#14, #13, #12) are formed so as to be located on the common straight line along the direction of arrangement of the contact terminals, it is therefore possible to reduce the length of the base member 42 along the direction of mounting and demounting of the IC cards and thereby to achieve downsizing of the IC card connector.

Figure 13:
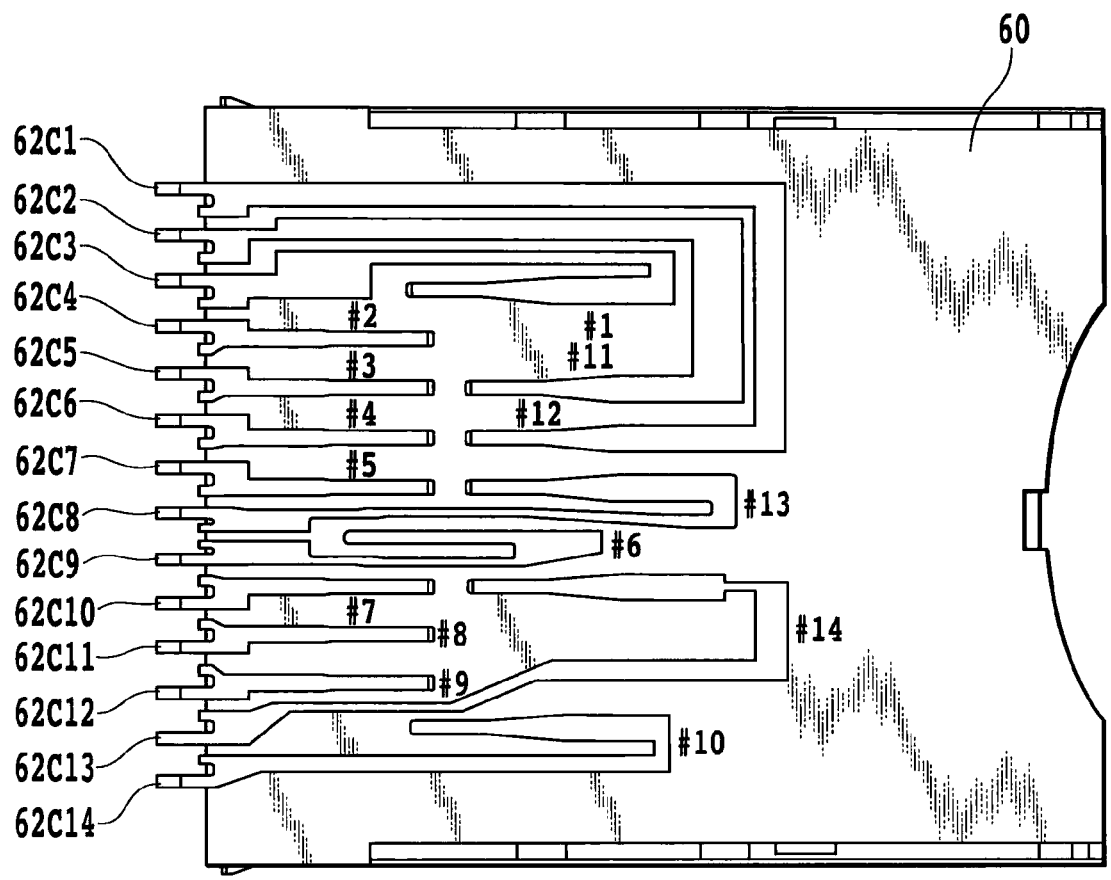
FIG. 13 is a plan view showing a still another example of the housing unit used in of the IC card connector according to the embodiments of the present invention.

The housing unit 60 shown in FIG. 13 is a reverse type housing unit. Specifically, the first IC card 22 or the second IC card 23 is mounted in the housing unit 60 while being turned upside down with respect to the housing unit 60 (in the conditions as shown in FIGS. 5A and 5B). A metallic cover member is disposed below the housing unit 60. Note that FIG. 13 is a top plan view of the housing unit 60.

In the example shown in FIG. 8, the bent portion of the data transfer line contact terminal 32C1 (#14) formed into a gate shape is formed so as to surround the data transfer line contact terminals 32C9, 32C2, and 32C3 (#13, #12, #11). On the other hand, in the example shown in FIG. 13, the bent portion of the data transfer line contact terminal 62C1 (#14) and the bent portion of the data transfer line contact terminal 62C1 (#12) are formed on a common straight line along the direction of the arrangement of the contact terminals. This configuration allows reduction in length of the housing unit 60 along the direction of mounting and demounting of the IC cards as compared to the example shown in FIG. 8 and thereby to achieve downsizing of the housing unit 60.

In FIG. 13, soldered terminal portions of contact terminals 62C1 to 62C14 protrude by the same length from an end of the housing unit 60 so that the protruded parts align with each other. In FIG. 13, reference numerals #1 to #14 denoted to the contact terminals 62C1 to 62C14 conform to reference numerals denoted to the above-described contact terminals 14ai (#2 to #5, #7 to #9), the contact terminals 16ai (#1, #10), the contact terminals 18ai (#11, #12, #13, #14), and the contact terminal 20ai (#6).

Accordingly, at a portion of the housing unit 60 opposed to the card accommodating portion and formed between both side walls, first and second grounding line contact terminals 62C14, 62C3 (#10, #1), data transfer line contact terminals 62C13, 62C8, 62C1, 62C2, (#14, #13, #12, #11), 62C4, 62C5, 62C6, 62C7, 62C8, 62C10, 62C11 (#2, #3, #4, #5, #7, #8), a power source line contact terminal 62C12 (#9), and a card detection line contact terminal 62C9 (#6) are arranged side by side in parallel to the side walls. Here, contact portions of the contact terminals are located away from a flat surface of the housing unit 60 by a predetermined height, the flat surface forming the card accommodating portion.

In this example as well, mounting of the first IC card 22 or the second IC card 23 is detected by use of the card detection line contact terminal 62C9 (#6) and the first and second grounding line contact terminals 62C14, 62C3 (#10, #1).

It is to be noted that, in the embodiments of the present invention, instead of the first IC card 22 or the second IC card 23, other memory cards such as the above-mentioned MEMORY STICK PRO-DUO (registered trademark) can also be detachably mounted to the housing unit 60.

Moreover, in the embodiments of the present invention, it is possible to arrange the contact terminals densely around the card detection line contact terminal 62C9 and thereby to downsize the IC card connector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An integrated circuit (IC) card connector comprising:
a housing forming a card accommodating portion configured to selectively and detachably house any one of a first IC card and a second IC card, the first and second IC cards each having a plurality of electrode pads, the first and second IC cards having data transmission speeds different from each other, the electrode pads of the first IC card being arranged at the same intervals as those at which the electrode pads of the second IC card are arranged;
grounding contact terminals, respectively, for the first IC card and the second IC card, the grounding contact terminals being disposed in the card accommodating portion, the grounding contact terminals including contact portions configured to come into contact with grounding line electrode pads of the first IC card and the second IC card when the IC card is mounted in the card accommodating portion;
a first data transmission contact terminal and a second data transmission contact terminal provided in the card accommodating portion and disposed so as to be adjacent to the respective ground contact terminals and to face each other along a direction of mounting and demounting of the first IC card and the second IC card, each of the first data transmission contact terminal and the second data transmission contact terminal including a contact portion configured to come into contact with data transmission electrode pads of the first IC card and the second IC card when the IC card is mounted in the card accommodating portion; and
a card detection contact terminal being provided substantially at a central part of the card accommodating portion and adjacent to the first data transmission contact terminal and the second data transmission contact terminal, the card detection contact terminal including a contact portion configured so that, when one of the first IC card and the second IC card is mounted in the card accommodating portion, the contact portion comes into contact with a card detection electrode pad of the mounted IC card, thereby detecting the mounting of the mounted IC card,
wherein, when any one of the first IC card and the second IC card is inserted to the card accommodating portion, the contact portions of the grounding contact terminals are brought into contact with the grounding line electrode pads, the contact portions of the first data transmission contact terminal and the second data transmission contact terminal are then brought into contact with the data transmission electrode pads, and the contact portion of the card detection contact terminal is brought into contact with the card detection electrode pad after a lapse of a predetermined time period, thereby detecting the mounting of the inserted IC card.

2. The IC card connector according to claim 1, wherein a wrong insertion preventing wall is formed in the card accommodating portion between the contact portion of the first data transmission contact terminal and the contact portion of the second data transmission contact terminal.

3. The IC card connector according to claim 1, wherein a fixation portion of the card detection contact terminal is inserted into a fixation groove formed in the card accommodating portion from a card slot through which any one of the first IC card and the second IC card passes.

4. The IC card connector according to claim 1, wherein fixation portions of the grounding contact terminals are inserted into fixation grooves formed on the card accommodating portion from a card slot through which any one of the first IC card and the second IC card passes.

5. The IC card connector according to claim 1, wherein fixation portions of the first data transmission contact terminal and the second data transmission contact terminal are inserted into fixation grooves formed in the card accommodating portion respectively in directions opposite to each other along the directions of mounting and demounting of the first IC card and the second IC card.

6. The IC card connector according to claim 1, wherein the card accommodating portion further includes an ejection mechanism configured to eject any one of the first IC card and the second IC card from the card accommodating portion, and the grounding contact terminals are located in the card accommodating portion such that the contact portions of the grounding contact terminals come into sliding contact with the grounding line electrode pads of any one of the first IC card and the second IC card when the ejection mechanism ejects any one of the first IC card and the second IC card in response to the pressing of the one of the first IC card and the second IC card.

7. The IC card connector according to claim 1, wherein the first data transmission contact terminal and the second data transmission contact terminal are provided such that ends of the first data transmission contact terminal and the second data transmission contact terminal located close to an open end of the card accommodating portion are located on a common straight line along a direction of arrangement of the first data transmission contact terminal and the second data transmission contact terminal.

* * * * *